(12) United States Patent
Vogel

(10) Patent No.: US 7,623,224 B2
(45) Date of Patent: Nov. 24, 2009

(54) CALIBRATION OF A SURVEYING INSTRUMENT

(75) Inventor: Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 186 days.

(21) Appl. No.: 10/581,480

(22) PCT Filed: Dec. 16, 2004

(86) PCT No.: PCT/EP2004/014365

§ 371 (c)(1),
(2), (4) Date: Jun. 1, 2006

(87) PCT Pub. No.: WO2005/059473

PCT Pub. Date: Jun. 30, 2005

(65) Prior Publication Data

US 2007/0104353 A1 May 10, 2007

(30) Foreign Application Priority Data

Dec. 16, 2003 (DE) ................................ 103 59 415

(51) Int. Cl.
*G01B 11/26* (2006.01)
(52) U.S. Cl. .................................. 356/141.5
(58) Field of Classification Search ....... 356/3.01–3.15, 356/4.01–4.1, 5.01–5.15, 6–22, 28, 28.5, 356/139.01–139.1, 141.1–141.5
See application file for complete search history.

(56) References Cited

U.S. PATENT DOCUMENTS 4,528,607 A   7/1985   Thompson (Continued)

FOREIGN PATENT DOCUMENTS

DE   19534415   3/1997

(Continued)

OTHER PUBLICATIONS

Y. D. Huang, Calibration of the Wlld P32 Camera Using the Camera-ON-Theodolite Method, Apr. 1998, Photogrammetric Record, pp. 97-103.*

(Continued)

*Primary Examiner*—Thomas H Tarcza
*Assistant Examiner*—Luke D Ratcliffe
(74) *Attorney, Agent, or Firm*—Cooper & Dunham LLP

(57) ABSTRACT

A method for calibrating a surveying instrument is disclosed the survey instrument comprising a base element (3) and a camera with an image sensor (10), the camera being rotatable about a vertical axis (2) fixed with respect to said base element and being rotatable about a tilting axis (4), the tilting axis being rotated about the vertical axis with rotation of the camera about the vertical axis, In the method, data associated with calibration points (P) and images (P1) of the calibration points on the image sensor captured in different faces are used, the data for each of said calibration points comprising distance data and the data for each of the images of each said calibration point comprising image position data and orientation data. Further, on the basis of the distance data for each of the calibration points and the image position and orientation data for each of the images of the calibration points the surveying instrument is calibrated simultaneously taking into account at least one optical property of the camera and at least one of the relative orientation of the vertical axis and the tilting axis and the orientation of the camera relative to one of the base element, the vertical axis and the tilting axis.

27 Claims, 20 Drawing Sheets

U.S. PATENT DOCUMENTS

| | | | |
|---|---|---|---|
| 5,150,260 | A | 9/1992 | Chigira |
| 5,638,222 | A | 6/1997 | Shigehara |
| 5,930,740 | A | 7/1999 | Mathisen |
| 6,633,665 | B1 | 10/2003 | Kim et al. |
| 6,731,329 | B1 | 5/2004 | Feist et al. |
| 6,847,462 | B1 * | 1/2005 | Kacyra et al. ............... 356/601 |
| 6,873,407 | B2 * | 3/2005 | Vogel ...................... 356/141.4 |
| 2002/0106205 | A1 | 8/2002 | Kikuchi et al. |
| 2003/0160757 | A1 | 8/2003 | Shirai et al. |
| 2004/0004706 | A1 | 1/2004 | Uezono et al. |
| 2006/0017938 | A1 | 1/2006 | Ohtomo et al. |

FOREIGN PATENT DOCUMENTS

| | | |
|---|---|---|
| DE | 19922321 | 11/2000 |
| EP | 0409875 | 6/1995 |
| EP | 0700506 | 4/1998 |
| EP | 0880674 | 2/2002 |
| EP | 0829701 | 11/2002 |
| EP | 1460377 | 9/2004 |
| GB | 2325578 | 11/1998 |
| GB | 2353862 | 3/2001 |
| JP | 59501967 | 11/1984 |
| JP | 2020814 | 1/1990 |
| JP | 2266311 | 10/1990 |
| JP | 4141609 | 5/1992 |
| JP | 8015590 | 1/1996 |
| JP | 10268173 | 10/1998 |
| JP | 2000214370 | 8/2000 |
| JP | 2001239886 | 9/2001 |
| JP | 2001242369 | 9/2001 |
| JP | 2005003463 | 1/2005 |
| WO | WO 2004083779 | 9/2004 |

OTHER PUBLICATIONS

Benning, W. "Statistik in Geodäsie, Geoinformation und Bauwesen", Herbert Wickmann Verlag (2002) pp. 140-141.

Deumlich, F.; Staiger, R. "Instrumentenkunde der Vermessungstechnik", Herbert Wickmann Verlag (2002) pp. 205-209, 224, 225.

Huang, Y.D. "Calibration of the Wild P32 Camera Using The Camera-ON-Theodolite Method" Photogrammetric Record, vol. 16, No. 91, (Apr. 1998) pp. 97-104.

Huang, Y.D.; Harley, I. (1990) "CCD Camera Calibration Without A Control Field", International Archives Of Photogrammetry And Remote Sensing, vol. 28, No. 5 (1990) pp. 1028-1034.

Luhmann, T. "Nabereichsphotogrammetrie: Grundlagen, Methoden und Anwendungen", Herbert Wickmann Verlag (2000) pp. 118-123.

Walser, B.; Braunecker, B. "Automation Of Surveying Systems Through Integration Of Image Analysis Methods" Proceedings of 6$^{th}$ Conference on Optical 3-D Measurement Techniques; vol. I (Sep. 2003) pp. 191-198.

Zhang, Z.; Zheng, S.; Zhan, Z. (2003) "Photo Total Station System an Integration Of Metric Digital Camera And Total Station" Proceedings of 6$^{th}$ Conference on Optical 3-D Measurement Techniques; vol. I (Sep. 2003) pp. 176-182.

English-language abstract of Japanese Publication No. JP2005003463, published Jun. 1, 2005, esp@cenet database.

English-language abstract of International Patent Publication No. WO 2004/083779, published Sep. 30, 2004, esp@cenet database.

English-language abstract of European Patent Publication No. EP1460377, published Sep. 22, 2004, esp@cenet database.

English-language abstract of German Patent Publication No. DE19534415, published Mar. 20, 1997, esp@cenet database.

English-language translation of German Patent Publication No. DE 19922321, published Nov. 23, 2000.

English language abstract of Japan Patent Publication No. JP 2-266311, esp@cenet database, Oct. 31, 1990.

English language abstract of Japan Patent Publication No. JP 10-268173, esp@cenet database, Oct. 9, 1998.

English language abstract of Japan Patent Publication No. JP 2-020814, esp@cenet database, Jan. 24, 1990.

English language abstract of Japan Patent Publication No. JP 2001-239886, esp@cenet database, Sep. 4, 2001.

English language abstract of Japan Patent Publication No. JP 2000-214370, esp@cenet database, Aug. 4, 2000.

English language abstract of Japan Patent Publication No. JP 2001-242369, esp@cenet database, Sep. 7, 2001

English language abstract of Japan Patent Publication No. JP 4-141609, esp@cenet database, May 15, 1992.

English language abstract of Japan Patent Publication No. JP 59-501967, esp@cenet database, Nov. 22, 1984.

English language abstract of Japan Patent Publication No. JP 8-015590, esp@cenet database, Jan. 19, 1996.

* cited by examiner

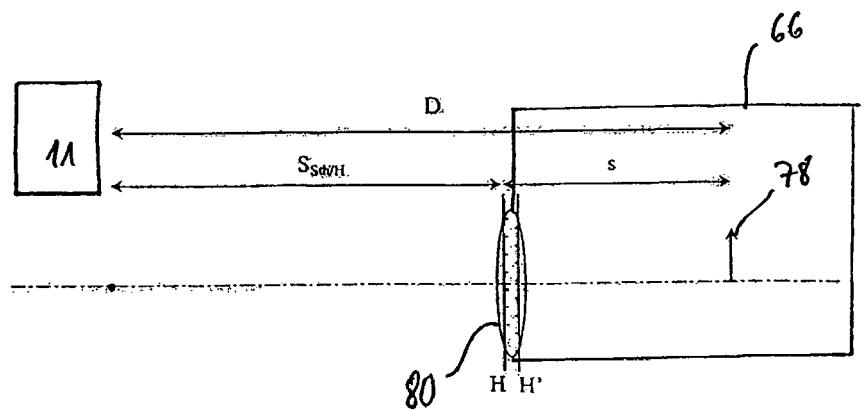
Fig. 16
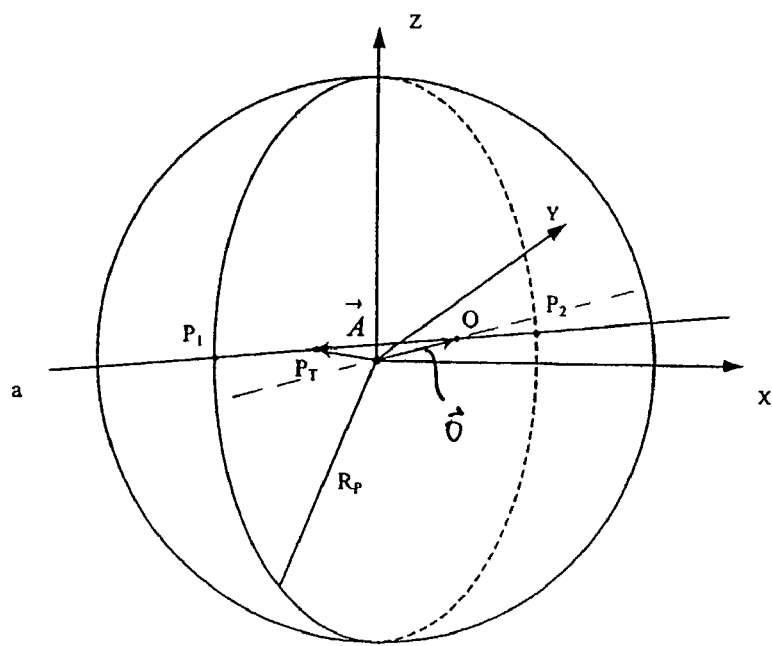
Fig. 17
Fig. 19

CALIBRATION OF A SURVEYING INSTRUMENT

The present invention relates to a method for calibrating a surveying instrument comprising a camera, means for carrying out the method and surveying instruments calibrated by use of the method.

Surveying often includes determination of angles or of positions of points, e.g. reflectors (triple reflectors) or targets in the terrain. Those angles or positions may be measured by surveying instruments such as theodolites or tacheometers.

Positions in space can be defined by coordinates in a suitable coordinate system. For example, the position of a point may be defined by its Cartesian coordinates which are defined with respect to a Cartesian coordinate system having three axes which are orthogonal to each other. For measuring positions, however, spherical coordinates are more appropriate. As shown in FIG. 1, the position of a point may be defined in spherical coordinates by its distance d to the origin of an orthogonal coordinate system, an angle α between one of the horizontal axes of the coordinate system and a line connecting the origin of the coordinate system with a projection of the point onto the horizontal plane and finally a vertical angle θ between the coordinate system axis orthogonal to the horizontal plane and a line connecting the origin of the coordinate system and the point. As well known in the art, Cartesian coordinates can be transformed into spherical coordinates and vice versa.

Surveying instruments such as theodolites or tacheometers, also known as tachymeters or total stations, make use of spherical coordinates. As schematically shown in FIG. 1, known theodolites or tacheometers comprise a telescope 1 which is rotatable about a vertical axis 2 which is fixed to a base element 3 of the theodolite or tacheometer and a tilting axis 4 which is rotated with rotation of a telescope 1 about the vertical axis 2. Angles of rotation about the vertical axis 2 and angles of tilting about the tilting axis can read from a corresponding horizontal circle 5 and a vertical circle 6.

In an ideal theodolite or tacheometer, the tilting axis 4 is orthogonal to the vertical axis 2 and both axes intersect in one point. Further, a line of the sight 7 of the telescope 1, also called sighting axis or sight axis, is orthogonal to the tilting axis 4 and further runs through the intersection point of the tilting axis 4 and the vertical axis 2. For measuring the position of a point, ideally, the theodolite or tacheometer is oriented such that the vertical axis 2 is perfectly perpendicular, i.e. it points in the direction of gravity. Then, a spherical coordinate system can be defined by a plane orthogonal to the vertical axis 2 and the vertical axis 2, the origin being the intersection point of the of the tilting axis 4 and by the vertical axis 2. By the horizontal circle 5 one axis of the coordinate system can be defined which is fixed with respect to the base element 3. For measuring the above-mentioned angles α and θ the sighting axis 7 of a telescope 1 is directed to the point to be measured by rotating the telescope 1 about the vertical axis 2 and tilting the telescope 1 about the tilting axis 4. The angle α can than be read from the horizontal circle and the angle θ from the vertical circle 6. Knowing the distance of the point from the instrument, the Cartesian coordinates can be easily obtained.

Practically, however, the above-mentioned conditions for an ideal theodolite or tacheometer are not met. Rather, the accuracy of measurements may be reduced by different types of errors. A first error relates to the orientation of the vertical axis 2. It should be perfectly perpendicular to the ground, i.e. it should point along the direction of gravity, but in practice it may not be so. This error is not caused by the instrument itself and thus can only be avoided by proper orientation of the surveying instrument. As second error, a line-of-sight error or collimation error may occur which is a deviation of the angle y between the sighting axis 7 and the tilting axis 4 from a right angle (see FIG. 2A). A third error is the so called tilting-axis error (see FIG. 2B) which is the deviation of the angle error between the tilting axis and the vertical axis from a right angle. Finally, a so called height-index error $z_0$ may occur which is the deviation between the true angle between the sighting axis and the vertical axis and the corresponding angle read on the vertical circle (see FIG. 2C). These last three errors are caused by tolerances of the surveying instrument. In order to be able to provide correct measurements, the surveying instrument needs to be calibrated, that is a relationship between the angles read on the horizontal and vertical circles and the corresponding true angles has to be established.

So called video-theodolites or video-tacheometers differ from traditional theodolites or tacheometers in that they comprise a camera which may for example replace the whole telescope or just the eyepiece of the telescope. As schematically shown in FIG. 3, the camera 8 comprises an optical system 9 and an image sensor 10. The optical system 9 forms images of points in a scene on the image sensor 10. A point to be measured is thus imaged onto a certain position on the image sensor 10. In order to determine from the position of the image of the point on the image sensor a direction from the surveying instrument to the point, the direction being defined by true vertical and horizontal angles, one needs to know the relationship between a position on the image sensor and a corresponding direction in space.

The optical axis of an ideal camera should be perpendicular to the plane of the image sensor and the optical system should be free of aberrations or distortions. Further, the optical axis should be parallel to a reference axis of the camera.

However, real cameras do not have these ideal properties. Thus, a calibration, i. e. a mapping between directions in space and corresponding positions of images of these directions on the image sensor, is necessary.

In the case of surveying instruments having a camera such as video-theodolites or video-tacheometers at least two calibrations appear to be necessary, namely one with respect to the axes of the instrument and the other with respect to the camera.

In an article by Y. D. Huang, "Calibration of the Wild P32 Camera using the Camera-ON-Theodolite method", published in Photogrammetric Record, 16(91), 1998, Huang connects one or at most two reference points arranged at different distances to the instrument, that is the system consisting of the surveying instrument proper and the camera. These reference points are observed with the camera to be calibrated at different instrument directions, i. e. different combinations of horizontal and vertical angles to be set on the instrument. As Huang uses a theodolite, the distance between the two points, or the distance between the points and the instrument must be known. A further drawback of Huang's method is that instrument errors such as vertical axis errors and lateral collimation errors remain out of consideration. However, calibration errors increase with the magnitude of these instrument errors, which diminishes the overall accuracy of the instrument.

Thus, it is an object underlying the invention to provide a method for calibrating a surveying instrument having a camera, in particular a video-theodolite or a video-tacheometer, the method being easy to perform and requiring only little information about the surveying instrument, and to provide means for executing the method.

According to a first aspect of the invention a method is provided for calibrating a surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, wherein data associated with calibration points and images of the calibration points on the image sensor captured in different faces are used, the data for each of said calibration points comprising distance data representing a distance between each said calibration point and the surveying instrument and the data for each of the images of each said calibration point comprising image position data representing the position of the image of each said calibration point on said image sensor and orientation data representing a horizontal angle of rotation of the tilting axis about the vertical axis and a vertical angle of tilting of the camera about the tilting axis, and wherein on the basis of the distance data for each of the calibration points and the image position and orientation data for each of the images of the calibration points the surveying instrument is calibrated simultaneously taking into account at least one optical property of the camera and at least one of the relative orientation of the vertical axis and the tilting axis and the orientation of the camera relative to one of the base element, the vertical axis and the tilting axis.

Further, according to a second aspect of the invention a method is provided for calibrating a surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, wherein images of calibration points are generated at different positions on the image sensor and in two faces, wherein for each of said calibration points the distance data representing a distance between the respective calibration point and the surveying instrument and for each image of said calibration points position data representing the position of the image of the calibration point on the image sensor, orientation data representing a horizontal angle of rotation of the tilting axis about the vertical axis and a vertical angle of tilting of the camera of the tilting axis are determined, and on the basis of the distance data for each of the calibration points and the position and orientation data for each of the images of the calibration points the surveying instrument is calibrated simultaneously taking into account at least one optical property of the camera and at least one of the relative orientation of the vertical axis and the tilting axis and the orientation of the camera relative to one of the base element, the vertical axis and the tilting axis.

These methods according to the invention are suited for any surveying instrument equipped with a camera, in particular video-theodolites and video-tacheometers.

The surveying instrument comprises a base element, which is in a fixed position relative to a point to be measured and in particular to the ground when the instrument is in use. For example, the base element may be mounted on a tripod or part of a tripod.

The surveying instrument further comprises a camera having an image sensor. The camera may further comprise an optical system or at least one lens to image points to be measured onto the image sensor. Preferably, the optical system may perform the complete imaging of object points at a distance from the surveying instrument. However, it is also possible that the camera only images an image of a calibration point generated by other optics of the surveying instrument. Optical properties of the camera can be in particular the imaging properties of the camera. Optical properties can include properties of the optics of the camera such as focal length of the lens or objective of the camera, the position and orientation of the image sensor relative to the lens or objective or image errors of the lens or objective of the camera.

The image sensor may be any at least two-dimensional arrangement of photo detecting elements which allows detecting light with a resolution in the at least two dimensions. The arrangement of the photo detecting elements can be arbitrary. Preferably, the elements are arranged as an at least approximately rectangular matrix or in a honeycomb pattern. The image sensor may comprise in particular CMOS elements or CCD elements as photo-detecting elements, in particular a CMOS array or a CCD array as well known in the art. The surveying instrument may further comprise an image acquisition unit which is connected to the image sensor and generates images from signals provided by the image sensor. The images may be provided in any suitable format as known to the person skilled in the art. Preferably the image data obtained form the image sensor and representing the image are compressed.

The camera is rotatable about a vertical axis of the surveying instrument which shall be in a vertical direction if the surveying instrument is used, but otherwise can have any direction. The camera can be further tilted about a tilting axis which is rotated when the camera is rotated about the vertical axis. In particular, the camera may be mounted on an alidade rotatable about the vertical axis. The tilting axis is preferably orthogonal to the vertical axis except for possible tilting axis errors.

The surveying instrument may further comprise a so called horizontal circle which serves to define the angular position of the tilting axis with respect to a predetermined direction in a plane perpendicular to the vertical axis, the vertical axis and thus the plane and the predetermined direction being fixed with respect to the base element. Further, the surveying instrument may comprise a so called vertical circle which can be used to determine the angular position of the camera with respect to rotations about the tilting axis in a plane perpendicular to the tilting axis. The angular position may be defined with any predetermined direction in the plane perpendicular to the tilting axis. Preferably the predetermined direction corresponds to the zenith when the instrument is in use or is coaxial with the vertical axis. The horizontal angle and the vertical angle can be used to uniquely define the orientation of the camera with respect to the base element.

The above-mentioned methods according to invention serve to calibrate such a surveying instrument. Calibration may in particular mean, that a relationship is determined between a direction, in which an object point lies with respect to a coordinate system fixed to the base element, termed the direction of the point, and the position of an image of the object point on the image sensor as well as the measured horizontal and vertical angles used when capturing an image comprising the image of the object point.

The method according to the second aspect differs from the method according to the first aspect, in that the second method includes the acquisition of the data used for calibration. Thus, the method according to the first aspect may be performed using any data which may be provided for example on a storage medium or via a connection to a device for carrying out the method.

For calibration at least two calibration points, which may also be regarded as or referred to as reference points, are used. Further, for each calibration point at least one image, preferably several images of the calibration point on the image sensor are generated. To this end, in a fixed relative position of the calibration point and the surveying instrument, the camera may be rotated about the vertical axis and/or tilted about the tilting axis. The method according to the first aspect (and also according to the second aspect) uses data for each calibration point representing a distance between the calibration points and the surveying instrument and image position data and orientation data for each image of each calibration point. The position data represent the position of the image of the calibration point on the image sensor when the calibration point is imaged onto the image sensor by the optics of the surveying instrument being in an orientation defined by the corresponding orientation data. The position data may for example be given by an identification for a pixel in a CCD array at the location of the image of the calibration point. The orientation data in particular represent corresponding horizontal and vertical angles which may be obtained by use of suitable measuring devices such as the horizontal or vertical cycle or by setting the camera in the corresponding orientation.

The data are generated in two faces of the surveying instrument. It is not necessary that two images of the same calibration point are obtained by bringing the instrument from a first face into a second face. The use to two faces with surveying instruments such as theodolites or tacheometers is well known in the art. If an object point can be viewed in a first face of the camera, the same point can also be viewed, except in the case of too large axis errors etc., when the camera is rotated by 200 gon or 180° and reversed by tilting about the tilting axis, i.e. in the second face.

These data, in the following also termed calibration data, are used to calibrate the surveying instruments. The calibration takes into account at least the relative orientation of the tilting axis relative to the vertical axis, that is, in particular, a tilting axis error, and simultaneously at least one optical property of the camera. An optical property of the camera can be any property of the camera being determined by the optics used for imaging and in particular the relative position between the optics and the image sensor.

Further, the calibration takes into account these error sources and properties simultaneously, i.e. the calibration is not carried out in at least two steps, in which a respective separate calibration is performed taking into account either only one of the error sources or only one optical property of the camera.

Due to the use of data obtained in different faces of the surveying instrument and the simultaneous inclusion of potential axis errors as well as an optical property of the camera a very precise and fast calibration of the surveying instrument can be achieved. Further, only few or no further instrument or camera data are necessary.

According to a third aspect of the invention a data processing system is provided, the data processing system comprising a processor, a memory, in which there is stored a computer program for performing the method according to the invention, when the program is executed by the processor, and further comprising an interface for reading data associated with calibration points and images of the calibration points used in the method. In particular the method according to the first aspect of the invention may be carried out by the data processing system.

The data processing system may be a separate device which needs to be connected to the surveying instrument only when the surveying instrument shall be calibrated. However, the surveying instrument itself may comprise a data processing system for processing of measured quantities according to predetermined tasks which has a memory in which the mentioned computer program is stored. This processor may be also used to run the computer program. Depending on the type of data processing system the processor may be a special microprocessor, a processor as used in personal computers or workstations or a digital signal processor.

As an interface any means can be used which allow reading of the data. In the simplest case, it can be a keyboard for typing in the required data or a reading device for reading a data carrier which can be exchanged. The reading device may be e.g. a CD-ROM drive, a DVD-ROM drive, a floppy disk drive or a reader for flash ROM memory devices, such as USB-sticks or memory cards. Advantageously, however, the interface is suited for a data connection between the surveying instrument and the data processing system via cable or a wireless link such as bluetooth, wireless LAN or optical interfaces. In another embodiment, the interface is also suited for outputting commands to the surveying instrument.

According to another aspect of the invention a computer program is provided, the computer program comprising program code for performing the method according to the first aspect of the invention, when the computer program is run on a computer.

According to a further aspect of the invention a computer program product is provided, the computer program product comprising program code stored on a computer readable storage medium for performing the method according to the first aspect of the invention, when said program product is run on a computer. The storage medium can be in particular a magnetic storage medium like a floppy disk or a hard disk, a magneto-optical disk or an optical storage medium like a CD or DVD. Also, permanent memories such as flash memory chips can be used.

The computer may be in particular realized by the data processing system mentioned above.

In particular, the computer program or computer program product may comprise program code for reading data associated with calibration points and images of the calibration points on the image sensor, for each of said calibration points the data comprising distance data representing a distance between said calibration point and the surveying instrument and for each of the images of the calibration point the data comprising image position data representing the position of the image of the calibration point on said image sensor and orientation data representing a horizontal angle of rotation of the tilting axis about the vertical axis and a vertical angle of tilting of the camera about the tilting axis, and wherein on the basis of the distance data for each of the calibration points and the image position and orientation data for each of the images of the calibration points the surveying instrument is calibrated simultaneously taking into account at least one optical property of camera and at least one of the relative orientation of the vertical axis and the tilting axis and the orientation of the camera relative to one of the base element, the vertical axis and the tilting axis. The data may be read from any storage medium or a memory, to which the data were written.

The calibration can be performed in several ways. According to a preferred embodiment of the invention, a model is used for calculating the positions of images of calibration points on the image sensor, the model comprising adjustable model parameters and using distance data and orientation data associated with each of the images of the calibration points, and for calibration the model is fitted to the position data by estimating at least directions of the calibration points and the model parameters using the distance data, the position data and the orientation data. The direction of a calibration point is the direction in which the calibration point lies with respect to the instrument. Since the distance of the calibration points to the surveying instrument is known, the directions of the calibration points suffice to fully determine the position of the calibration points with respect to the surveying instrument, that is at least the base element. The directions may be represented by two angles of spherical coordinates of the calibration points in a coordinate system fixed to the base element, the third spherical coordinate being the distance between the calibration point and the surveying instrument. This type of calibration allows to account for different properties of the instrument which may have an effect on the position of an image of a calibration point on the image sensor and also may allow the calculation of the quality of the fit. The quality of the calibration strongly depends on the model used for calibration. The better the model represent the properties of the instrument, the better the model can be fitted to the calibration data used for calibration.

The directions of the calibration points and the model parameters can be estimated by any suitable estimation method. However, it is preferred that for estimation of the directions of the calibration points and of the model parameters a maximum likelihood estimate is used. In particular a least squares fit can be performed, which minimizes deviations between the measured positions of the images of the calibration points on the image sensor and positions of the images of the calibration points as calculated by the model. These types of estimates can be carried out quite fast.

The imaging properties of a camera may depend on the distance of a point to be imaged and/or the focusing state of the camera, e.g. the position of the objective of the camera or at least one lens of the objective of the camera relative to the image sensor. To allow a precise calibration also in this case, it is preferred, that at least one of the model parameters depends on the distance of the calibration point from the surveying instrument or on a focusing state of the camera when capturing an image of the calibration point. The model parameter may depend in a smooth way on the distance or the focusing state of the camera. Alternatively, the range of possible distances or the range of objective and/or lens positions may be divided into a predetermined number of subranges. Then the parameter may take different values for each subrange.

In a particularly preferred embodiment, the model comprises a transformation for transforming coordinates of an instrument coordinate system fixed to the base element to a camera coordinate system fixed to the camera and a camera model for mapping positions of calibration points to positions on the image sensor in the camera coordinate system. The transformation has adjustable transformation parameters and the camera model has adjustable camera parameters. For calibration, the coordinates of the calibration points in the instrument coordinate system and the transformation parameters and camera parameters are estimated, so that positions of the images of the calibration points as calculated by the model are fitted to the measured positions of images of the calibration points. This type of model allows a conceptually clear separation of characteristics of the instrument, in particular the instrument axes and the mounting of the camera, from camera properties and in particular optical properties of the camera. By the method according to this embodiment the magnitude of axis errors may be determined. These could be used to improve the construction of the surveying instrument, its manufacture or a mechanical re-adjustment. In particular, at least one of the camera model parameters may depend on the distance and/or focusing state of the camera as described in the paragraph above.

The transformation preferably includes at least one parameter relating to a tilting axis error. Preferably, the calibration is performed also taking into account at least one of a vertical index error and a collimation error. In this context a collimation error is a deviation of the angle between the tilting axis and one of a camera axis, a sighting axis, and an imaging axis provided by the camera model from a right angle, i.e. 90° or 100 gon. The vertical index error is the deviation of a reading of the vertical angle on a vertical circle when the camera points to the predetermined direction in plane perpendicular to the tilting axis, preferably the zenith, from the true vertical angle. Preferably, the transformation includes at least one parameter representing one of the collimation error and the vertical index error. These errors can easily be accounted for when using a model comprising a transformation and a camera model, because the corresponding effects on the transformation can be incorporated by suitable rotation matrices.

Further, the calibration preferably includes estimating the orientation of the camera relative to one of the tilting axis and an instrument coordinate system fixed to the base element. The orientation of the camera may in particular relate to the orientation of an axis defined by mechanical elements of the camera such as an axis defined by lens holders. Preferably, in this case the transformation includes at least one parameter representing the orientation of the camera relative to one of the tilting axis and an instrument coordinate system fixed to the base element. Hereby errors due to a mis-orientation of the camera may be accounted for.

Generally, for the methods according to the invention, arbitrary camera models can be used. However, it is preferred, that the camera model comprises a projection center in which according to the camera model all rays from object points imaged onto the image sensor intersect, that in the method at least one model parameter relates to the location of the projection center. The location of the projection center may be expressed relative to the base element, in particular to an instrument coordinate system fixed to base element. Especially in the case, when the field of view of the camera is rather limited preferably a pin hole model may be used as a camera model which allows quite simple model equations but still sufficient accuracy. To achieve a good accuracy of the calibration, the model preferably comprises at least three model parameters which represent the location of the projection center. Thus, instruments having cameras in an arbitrary position relative to the axes of the instrument can be calibrated quite accurately.

Further, in order to represent some of the optical and in particular imaging properties of the camera, in one embodiment of the invention the camera model comprises a parameter representing the distance between an image plane of the model and the projection center. In particular, the parameter may reflect the camera constant in the pinhole camera model. The image plane is preferably determined by the image sensor. To allow a precise calibration also of cameras with a long focal length, at least the camera constant may depend on the distance and/or focusing state of the camera.

The location of the projection center relative to the image plane is largely determined by the optical properties of the optical system of the camera and thus represents an optical property of the camera in the sense of the invention. In particular, it may be related to the focal length of the optical system of the camera. Thus, different types of optical systems can be easily modeled without using further data on the camera or the optical system of the camera.

To achieve a high accuracy of calibration, the camera model preferably comprises model parameters representing distortions in the image. These distortions may be due to e.g. imperfections of the optics of the camera.

For determining model parameters relating to optical properties of the camera, preferably the distance data associated with at least two calibration points differ. Thus, the respective calibration points are located at different distances from the surveying instrument. The accuracy of the method and thus the accuracy of the calibration may become better, the larger the difference between the distances of the points from the surveying instrument is.

Further, in order to be able to determine model parameters representing a tilting axis error with good accuracy, preferably at least two images of at least one calibration point are used, which have a considerable height, i.e. are close to the zenith.

Also, for obtaining a high accuracy of the calibration, preferably the number of images of calibration points is larger than the number of adjustable model parameters, particularly much larger.

The accuracy of the calibration may be further enhanced, if for each image of at least one of the calibration points more than one determination of image position data and/or orientation data is made.

Preferably, the image position data comprise data explicitly representing the position on the image sensor. For instance, these data may be the given by an identification code of a photo-detecting element at the respective position. The identification code, e.g. the address of a pixel or photo-detecting element, may be used to calculate a position, if necessary. However, the model can also provide the identification code directly.

In another embodiment, however, it is preferred that images captured by the image sensor are obtained, the captured images comprising images of at least one of the calibration points, and that the position of said images of said at least one of the calibration points on the image sensor is determined by searching for the images of the calibration point in the images. Thus, this embodiment allows to determine the actual positions of the images of a calibration point automatically from an image taken by the camera. The images of the calibration points can be recognized in the image captured by the image sensor by any suitable known object recognition methods.

For example, two images can be taken using the same orientation of the camera, one image comprising the image of the calibration point and the other image showing the background only. Then, the images can be subtracted from each other so that only the calibration point remains as a signature in the resulting difference image, which signature be detected by means of a threshold criterion. If the shape of the target representing the calibration point is known, also templates can be used. The position of the template is varied to match the template to the image of the calibration point in the image, which can be done for example by correlation methods known in the art.

Thus, it is preferred that a template representing one of the calibration points is used to search for the images of the calibration point.

The distance data of the calibration points can be obtained by several methods. If the instrument is calibrated using predetermined calibration points the distance of these points can be predetermined and either provided as known data or included in a computer program specially adapted for use with these calibration points. To this end, a predetermined location can be provided in which the instrument is placed when it is calibrated. In particular, when a video-tacheometer is calibrated using real calibration points, it is preferred, that the distance of at least one of the calibration points to the surveying instrument is determined using opto-electronic distance metering. Opto-electronic distance metering, i.e. opto-electronic distance measurement, allows a quite precise measurement of distances. Further, the measurements can be made at the time when the images of the calibration points are generated. For instance, two known methods may be used, for example determination of the distance by phase differences or by time-of-flight measurements using a pulsed laser beam.

As another alternative the calibration points can be provided in a known distance from the surveying instrument.

The calibration points may be provided in form of a real object, e.g. a co-operative target like a reflector (triple reflector) or an object in the field. However, the calibration point does not need to be a point of a real object. According to one preferred embodiment of the method according to the second aspect of the invention, at least one object point is imaged to a virtual calibration point which is imaged onto the image sensor. The object point can be any real object or a point of a real object, for example a light source or an illuminated cross-hair or slit. This embodiment allows calibration also using calibration points in a large virtual distance from the surveying instrument.

In a particularly preferred embodiment of the method, the virtual calibration points are generated by means of a collimator and a mark that can be shifted between a collimator objective, in particular an collimator lens, and the focal point of the collimator objective. Generally more than one collimator can be used, in particular if calibration points at different heights shall be obtained. As another option, in one collimator an arrangement of at least two marks can be used to generate a respective number of virtual calibration points at the same time. Collimators are characterized in that they emit parallel rays of light and project a point at optical infinity to a finite distance. The mark, e.g. a cross-hair, slit or a stop of other shape—is provided at the collimator's focal point to generate an image of the mark at infinity. The mark may be shiftable in the collimator by means of a suitable drive mechanism, which can operated manually or by means of a motor. Preferably, an extensible collimator is used, having an objective part comprising an objective of the collimator and an illumination part comprising an illumination device, the objective part and the illumination part being shiftable with respect to each other. The mark may be mounted in the illumination part, so that shifting of the illumination part relative to the objective part may be used to generate virtual images of the mark in different virtual distances. Preferably, the amount of shift can be read to micrometer accuracy.

Preferably the distance of a virtual calibration point is obtained on the basis of the distance between an object point and imaging optics for generating the virtual image of the object point, the distance between the imaging optics and the surveying instrument and on the basis of the imaging properties of the imaging optics. In particular in the case of a collimator, from the amount of shift relative to the focal point and from the focal length of the objective, one can determine the image distance of the virtual, erect image which represents the virtual calibration point. This virtual image can be sighted at with the surveying instrument to be calibrated. From the sum of the distance from the vertical axis of the instruments to the principle plane or principle focal plane of the collimator objective or collimator lens and from the image distance the final virtual distance between the instrument and the virtual calibration point created by the collimator can be calculated.

A collimator can thus be used to generate the virtual calibration points at virtual distances as large as 2.000 meters or more whereas it is difficult to create calibration points at such distances without a collimator. In particular, it may be difficult to find such a large distance in a field that is free from sighting obstacles. Further, additional factors that can impair the calibration measurements at large distances such as atmospheric phenomena like air turbulence can be avoided. Moreover, calibration point targets of different sizes would be needed for different distances in order to obtain images of approximately equal size. Calibration by means of a collimator is therefore particularly suitable for calibration of instruments after manufacture as it takes little space and may work essentially automatic. Finally, this method makes a calibration independent of environmental conditions, as the image sensor of a camera, for example detector matrix array, which, as a rule, is composed of pixels, is frequently subject to influences by ambient light.

Preferably a data processing system according to the invention comprises an output interface for outputting commands to a drive of a collimator for moving a mark of the collimator between an objective of the collimator and the focal point of the collimator, and the computer program comprises instructions to move the mark to generate virtual calibration points at different distances. In detail the instructions may generate control commands which are issued to the drive when the program is run. Preferably the computer program and computer program product according to the invention comprises program code may generate control commands which are issued to a drive of a collimator having a mark shiftable by the drive.

According to another aspect of the invention a system for calibrating a surveying instrument is provided, the surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, the system comprising a collimator, a mark that can be shifted between a collimator objective and a focal point of the collimator objective, and a drive for shifting the mark, and a data processing system according to claim 19 or to claim 19 and 20, the output interface being connected with the drive of the collimator to move the mark in response to control commands generated by the data processing system. This system may used to perform the method according to the invention. Preferably, the drive comprises a stepping motor so that the position of the mark in the collimator can be set precisely. Alternatively, a positioning device can be used comprising a position sensor the signals of which are used to control a motor of the drive to move the mark to a predetermined position.

The number of calibration points and the number of images of each calibration point may preferably be chosen according to the following criteria: The total number of images of all calibration points used shall be larger than the number of model parameters used for calibration. In order to obtain a good accuracy, the number of images should be much larger than the number of parameters. As mentioned above, at least two calibration points should be provided in different distances from the surveying instrument.

In particular, to obtain a calibration also for off-axis points on the image sensor it is preferred, that the images for at least one of the calibration points are generated at different positions of the image sensor. Preferably, they are distributed homogeneously over at least a predetermined area of the image sensor.

A predetermined distribution of image points can be obtained in different ways. According to a preferred embodiment of the invention, for at least one of the calibration points the positions of images of the image sensor are predetermined, the camera is directed to the calibration point by at least one of rotating about the vertical axis and tilting about the tilting axis until the calibration point is imaged to the predetermined position of the image sensor, and the resulting orientation data are read and preferably stored. Preferably, the camera can be re-oriented using a closed loop control. Preferably the data processing system according to the invention further comprises an interface for issuing control commands to the surveying instrument, the surveying instrument comprising a base element and a camera with an image sensor, the camera being rotatable about a vertical axis fixed with respect to said base element of the surveying instrument and being rotatable about a tilting axis, the titling axis being rotated about the vertical axis with rotation of the camera about the vertical axis and the surveying instrument comprising drives for rotating the camera about the vertical axis and tilting the camera about the tilting axis controllable by the control commands, the computer program further comprising program code to generate images of a calibration point and predetermined positions on the image sensor. Also the computer program and the computer program product according to the invention preferably comprise a program code to generate images of a calibration point and predetermined positions on the image sensor by issuing control commands to the surveying instrument. The program code may be adapted to issue control commands to be output over a suitable interface to the surveying instrument. The control commands may cause a re-orientation of the camera by means of the drives. Once the re-orientation is completed, another image is captured and, e.g. sent to the data processing system, which determines the position of the image of the calibration point and its deviation from the predetermined position and issues further control commands. Thus, an automatic calibration is possible requiring only very little action by a person.

In one preferred embodiment of the method according to the second aspect of the invention for at least one of the calibration points images of the calibration point are generated in a regular arrangement on the image sensor. In particular, in the case that an image sensor with a rectangular arrangement of photo detecting elements is used, the regular arrangement may be given by a rectangular grid. The grid may chosen such that when positions are set that represent the angle combinations, the reference points are distributed as homogeneously as possible all over the plane of the image sensor. Of course, other regular arrangements, for example hexagonal arrangements may be used.

If readings of the position data are taken always at the same positions on the image sensor, faults or defects in the image sensors may prevent a reliable calibration. According to a preferred embodiment for at least one of the calibration points an arrangement of cells covering a predetermined area of the image sensor is generated and random positions within the cells are used as positions of images of the calibration point. Preferably the predetermined area of the image sensor comprises at least the area of the image sensor used for surveying tasks. The arrangement of cells may be generated by providing cell reference points, e.g. a geometrical center, at positions determined by the arrangement and the size and shape of the cells. Generally, the cells can be arbitrarily arranged. Preferably, however, the cells are regularly arranged. For example a matrix like arrangement of cells can be used. The random positions within the cells may be obtained by means of a so called pseudo random-number generator which generates pseudo-random numbers distributed according to a predetermined probability distribution. Suitable random number generators are for example discussed in Press, H. et al.: "Numerical Receipes in C", Cambridge University Press, 1992, pp. 274-286. The use of random positions allows reduction of the influence of faulty photo-detection elements on the calibration.

In one preferred embodiment of the method at least two random positions are given for each cell, and a first image of the calibration point is generated at the first of these random positions in the first face and a second image of the calibration point is generated at the second of the random positions in the second face. Thus, the random positions of each angle combination need not be equal for the first and second faces and may be determined separately. It is one advantage of this embodiment, that the random positions and the corresponding orientation data can be determined first for each cell in first face and later for each cell in second face.

Alternatively, for at least one of the calibration points the camera is directed into predetermined orientations, the orientations being defined by predetermined combinations of horizontal and vertical angles or horizontal and vertical angle increments, and in each orientation image position data for a respective image of the calibration point are obtained. This embodiment allows a rapid setting of the horizontal and vertical angles, since no closed loop control is necessary to control the orientation of the camera. The rotations or tilts can be defined by angles to be reached or by angle increments between successive re-orientations of the camera. In particular, if a method according to the invention is used for calibration of a large number of surveying instruments of the same type, the horizontal and vertical angles can be chosen such, that, apart from tolerances in the surveying instrument, a desired distribution of image positions on the image sensor can be obtained. These combinations of horizontal and vertical angles can be stored and used for each surveying instrument to be calibrated.

In a preferred embodiment for at least one of the images of calibration points, the image position data and the corresponding orientation data are obtained for both faces. Thus, after obtaining data for the first face, the camera is rotated by 200 gon or 180 degrees about the vertical axis and then tilted to a vertical angle of 400 gon minus the vertical angle set for the measurement in the first face. Herein it is assumed that a vertical angle of 0 corresponds to the zenith. In this case a tilting axis error may show up more explicitly in the data used for calibration, so that calibration may be more precise and/or faster.

Once the calibration of a surveying instrument having a data processing unit for processing image data obtained by the image sensor is completed, the corresponding model data can be stored in data processing unit separate form the surveying instrument or a data processing unit integrated into the surveying instrument. Further, a program may be stored in the data processing unit, which program allows computation of directions of object points imaged onto the image sensor on the basis of the model used for calibration, the obtained model parameters and the set horizontal and vertical angles.

Hence, according to a further aspect of the invention a surveying instrument is provided, the surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, the survey instrument being calibrated using a method according to the invention. In particular, the surveying instrument may comprise a non-volatile memory in which values of the model parameters obtained from calibration and program code for performing calculations using the model used for calibration are stored, and a processor for executing the program.

Thus, according to another aspect of the invention also a surveying instrument is provided, the surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, wherein imaging of an object point on the image sensor by the camera can be modeled by use of a camera model working a coordinate system fixed to the camera and a transformation model for transforming coordinates between an instrument coordinate system and the camera coordinate system, the instrument further comprising a data processing unit, in which program code is stored for determining a direction of an object point captured by the camera using the camera and transformation models, wherein a direction from the origin of the instrument coordinate system to the object point is calculated using a direction obtained by means of the camera model and the transformation model and the distance of the object point from the origin of the instrument coordinate system. Preferably, the surveying instrument further comprises a distance measuring device for measuring the distance between an object point and the origin of the instrument coordinate system. Preferably, the origin of the instrument coordinate system is the intersection point or point of closest approach of the tilting axis and the vertical axis, so that the instrument can be used as a known tacheometer with a telescope only. In particular, the camera may be offset from the origin of the instrument coordinate system in a direction parallel to the tilting axis.

Also, a computer program for a surveying instrument is provided, the surveying instrument comprising a data processing system, a base element and a camera with an image sensor, the camera being rotatable about a vertical axis fixed with respect to said base element and being rotatable about a tilting axis, the tilting axis being rotated about the vertical axis with rotation of the camera about the vertical axis, wherein imaging of an object point on the image sensor by the camera can be modeled by use of a camera model working in a coordinate system fixed to the camera and a transformation model for transforming coordinates between an instrument coordinate system and the camera coordinate system, the computer program comprising program code for determining a direction of an object point captured by the camera using the camera and transformation models, wherein a direction from the origin of the instrument coordinate system to the object point is calculated using a direction obtained by means of the camera model and the transformation model and the distance of the object point from the origin of the instrument coordinate system when the program is executed by the data processing system.

According to yet another aspect of the invention a surveying instrument is provided, the surveying instrument having a camera with an image sensor, wherein imaging of an object point on the image sensor by the camera can be modeled by use of a camera model having a projection center, a display for displaying images based on images captured by the image sensor, and a control unit for controlling the display to display a mark indicating a sighting axis, the sighting axis being defined by the projection center and the intersection point or point of closest approach of the tilting axis and the vertical axis. This photogrammetric definition of the sighting axis has the advantage that a cross-hair defined by the intersection of this photogrammetric sighting axis with the image plane, i. e. the image sensor plane, the vertical index error and the lateral collimation error are constant independent of distance. Theses errors can thus be easily taken into account in the processing of measured data.

Exemplary embodiments of the invention are explained in more detail below by way of example and with reference to the drawings. In the drawings FIG. 1 shows a schematic perspective view of a tacheometer with a corresponding coordinate system and an object point;

Figure 1:
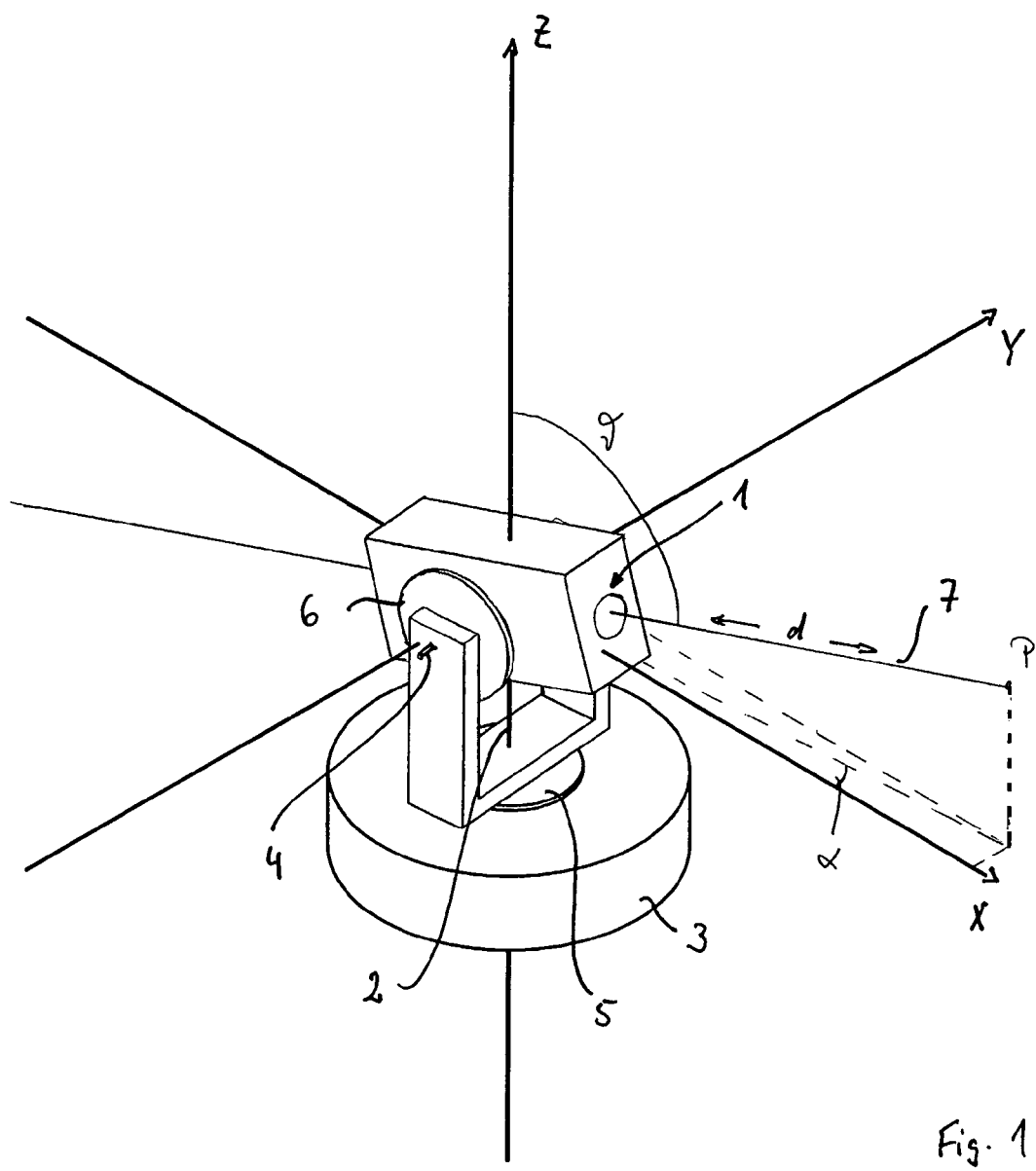
Figure 2A:
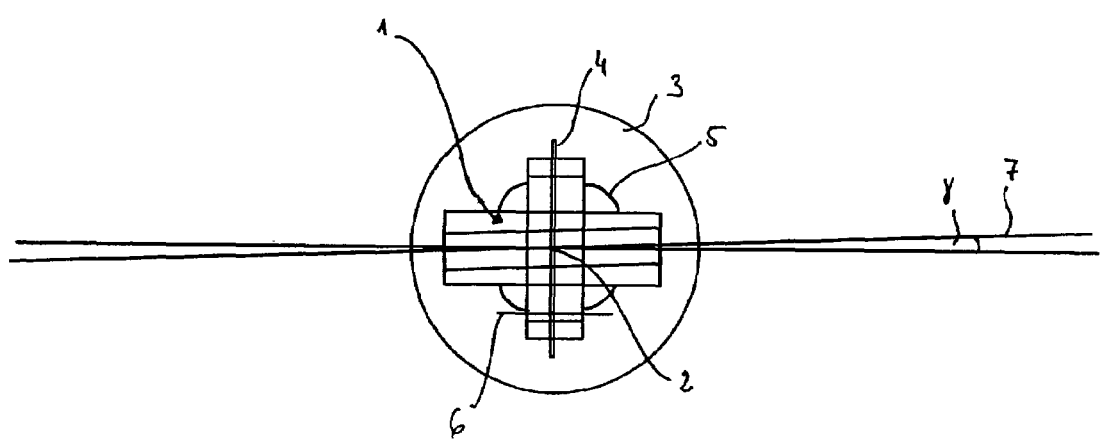
FIG. 2A shows a top view of a tacheometer as in FIG. 1, the instrument having a collimation error.
Figure 2B:
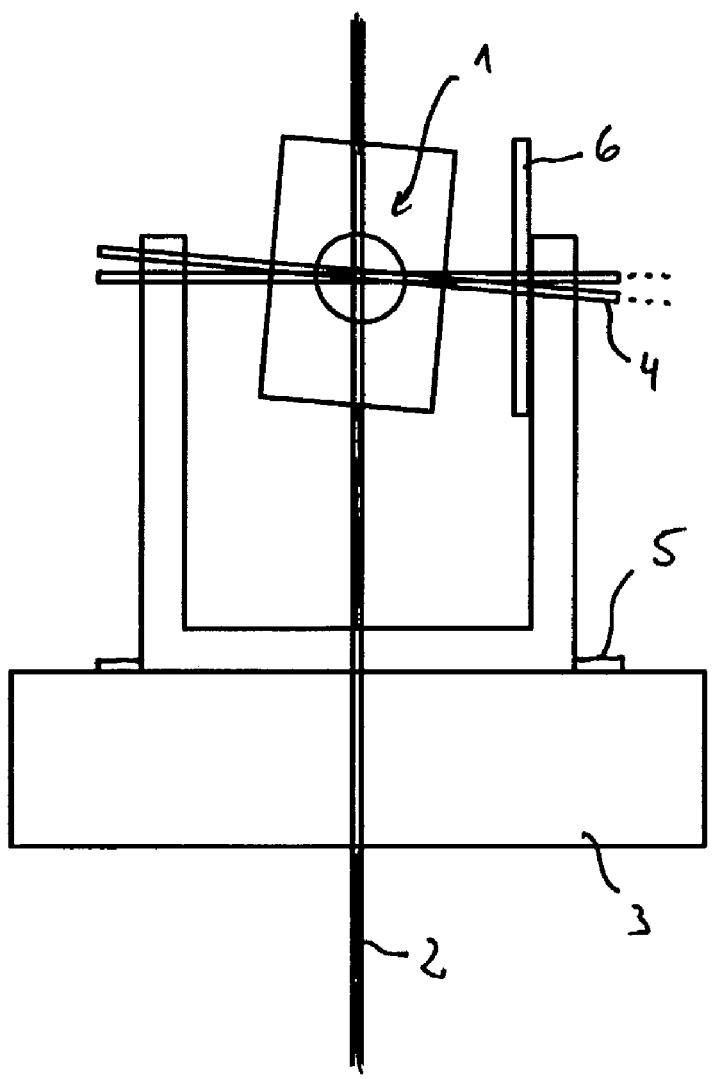
FIG. 2B shows a front view of a tacheometer as in FIG. 1, the instrument having a tilting axis error.
Figure 2C:
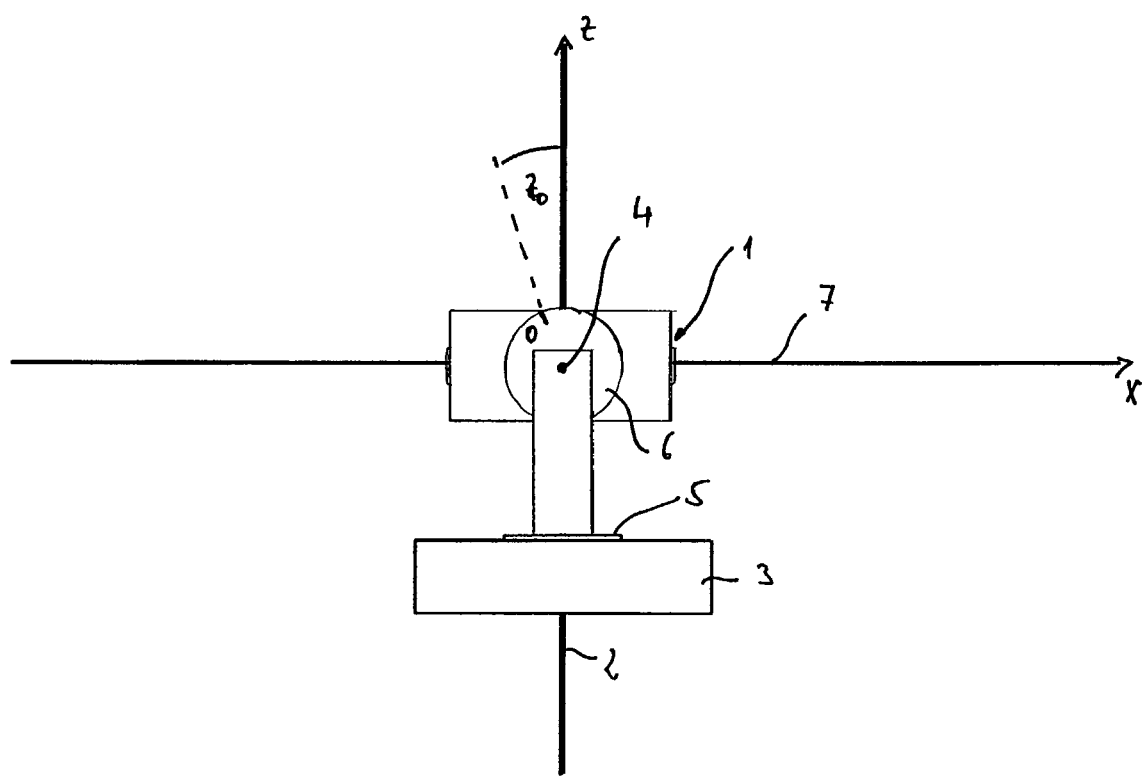
FIG. 2C shows a side view of a tacheometer as in FIG. 1, the instrument having a vertical height index error.
Figure 3:
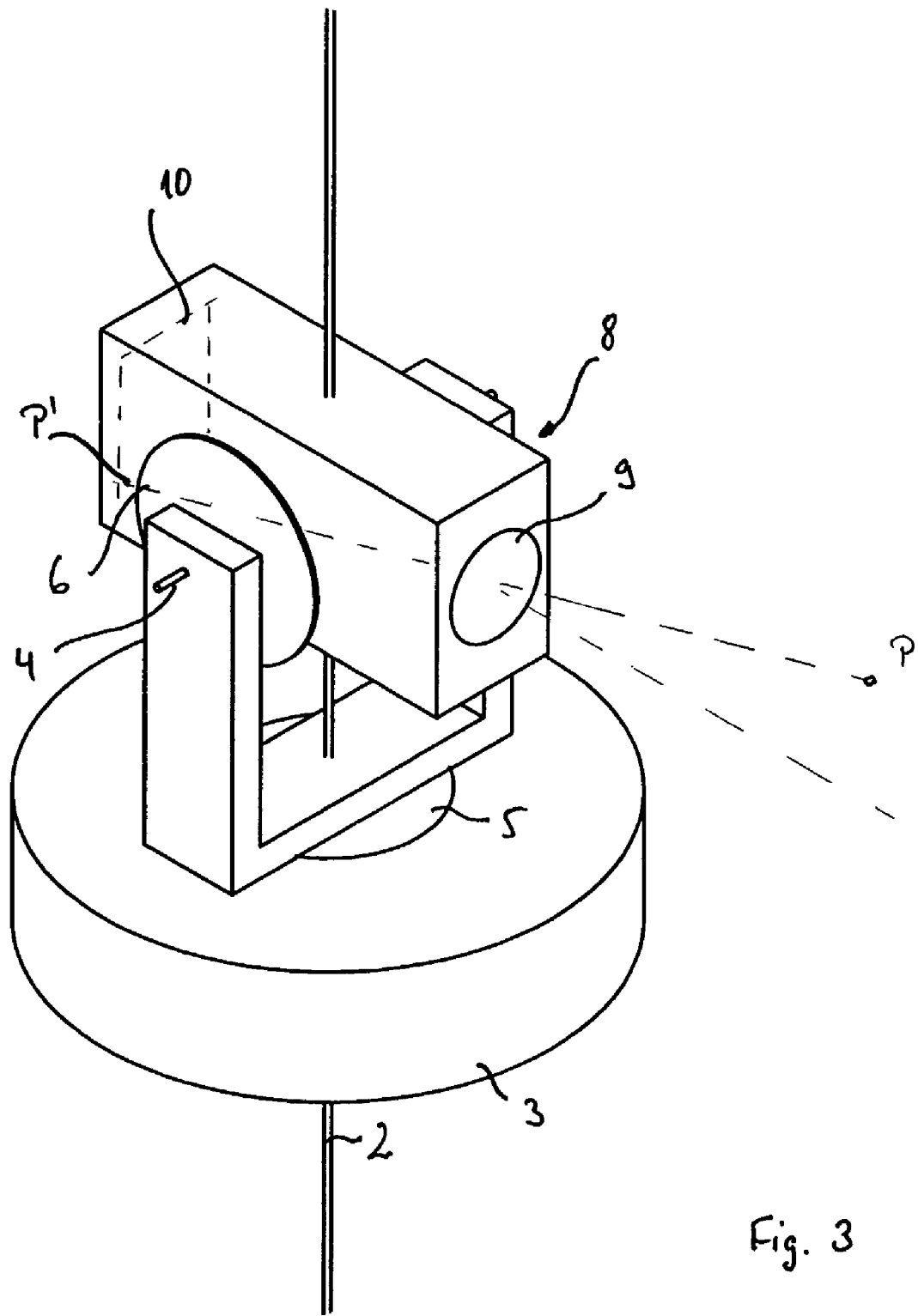
FIG. 3 shows a simplified perspective view of a video-tacheometer.
Figure 4:
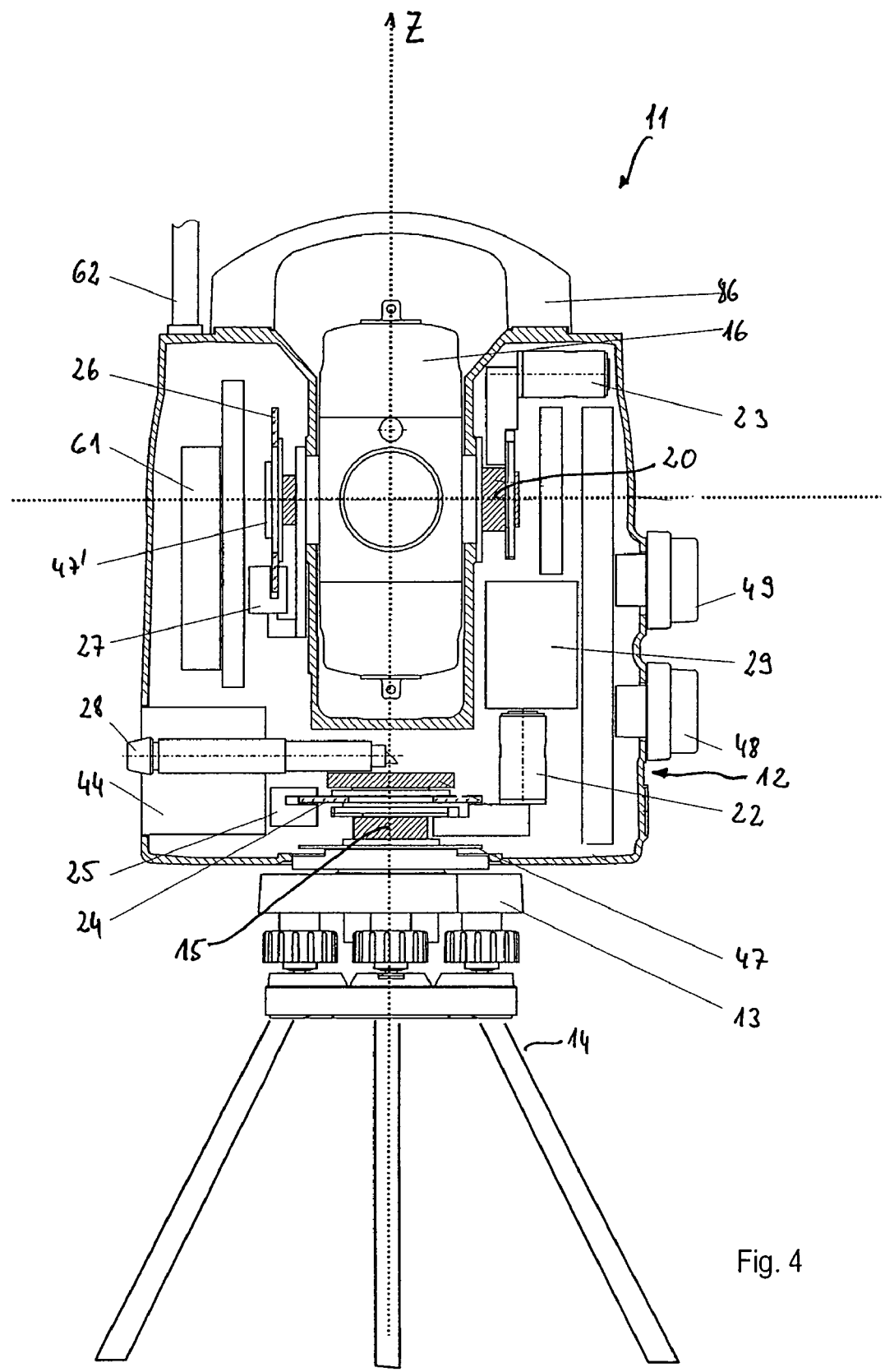
FIG. 4 shows a front view of a video-tacheometer for use with the invention.
Figure 5:
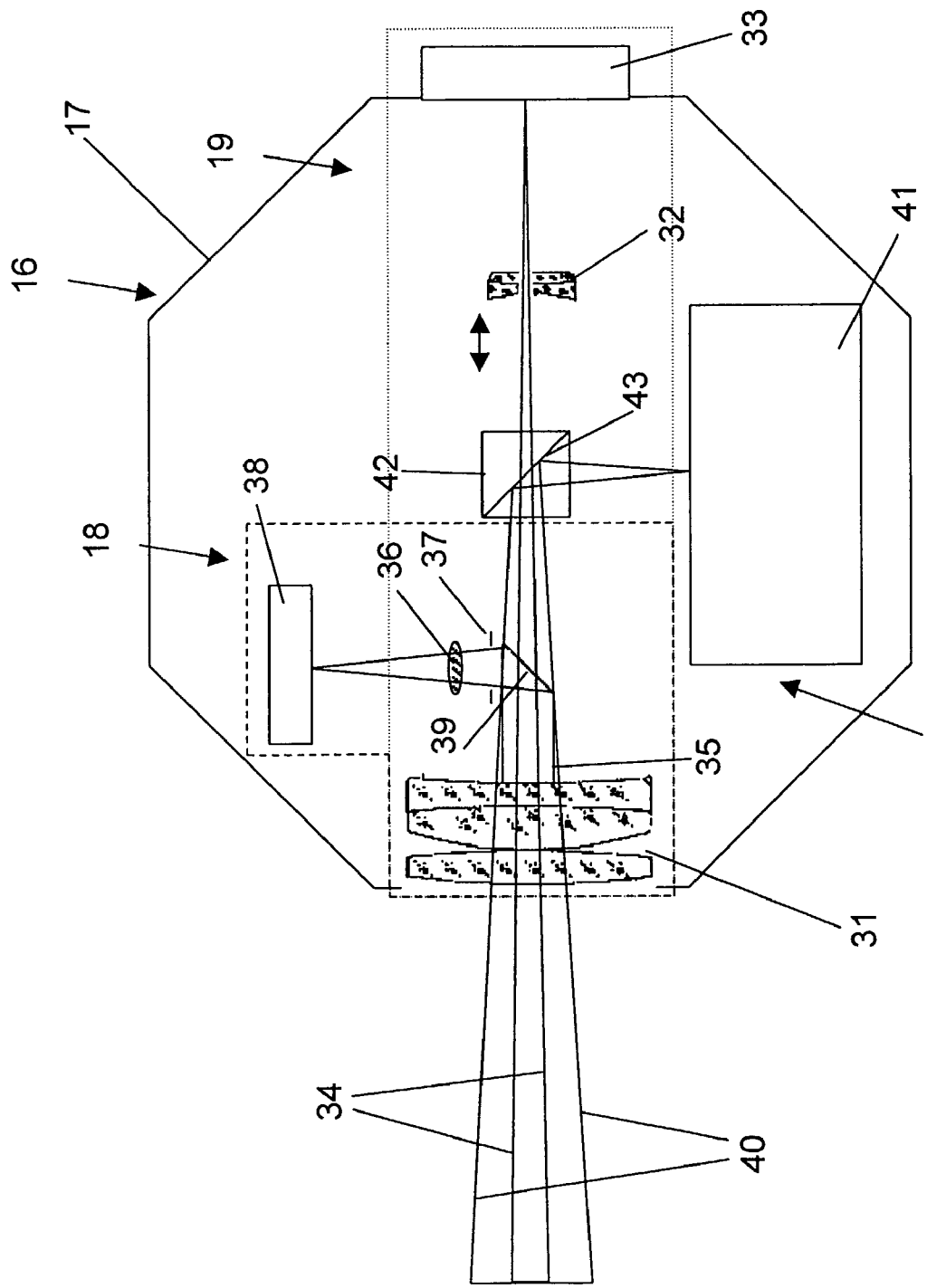
FIG. 5 shows a side view of a telescope unit of the video-tacheometer in FIG. 4.
Figure 6:
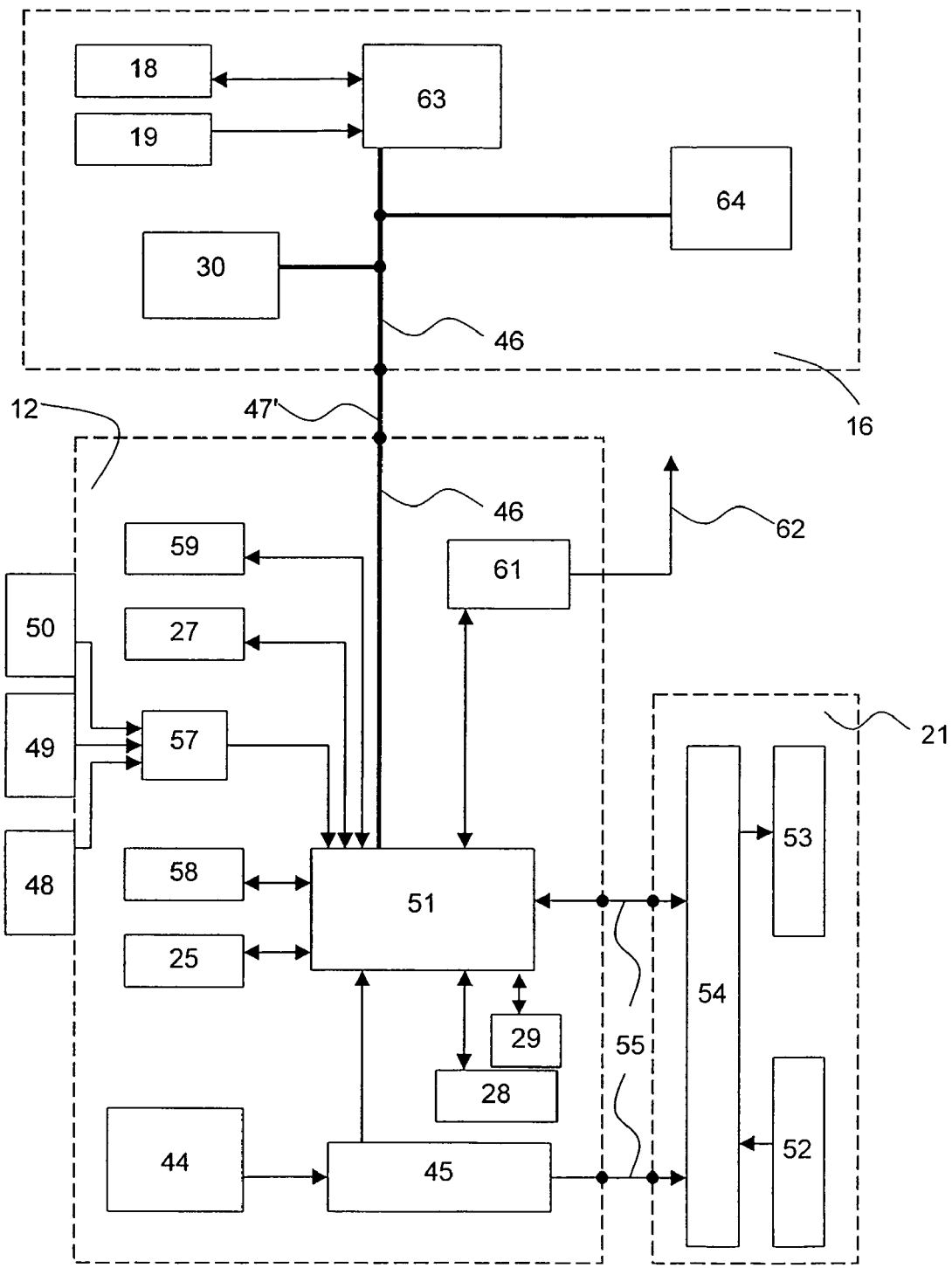
FIG. 6 shows a schematic block diagram of the video-tacheometer in FIG. 4.
Figure 7:
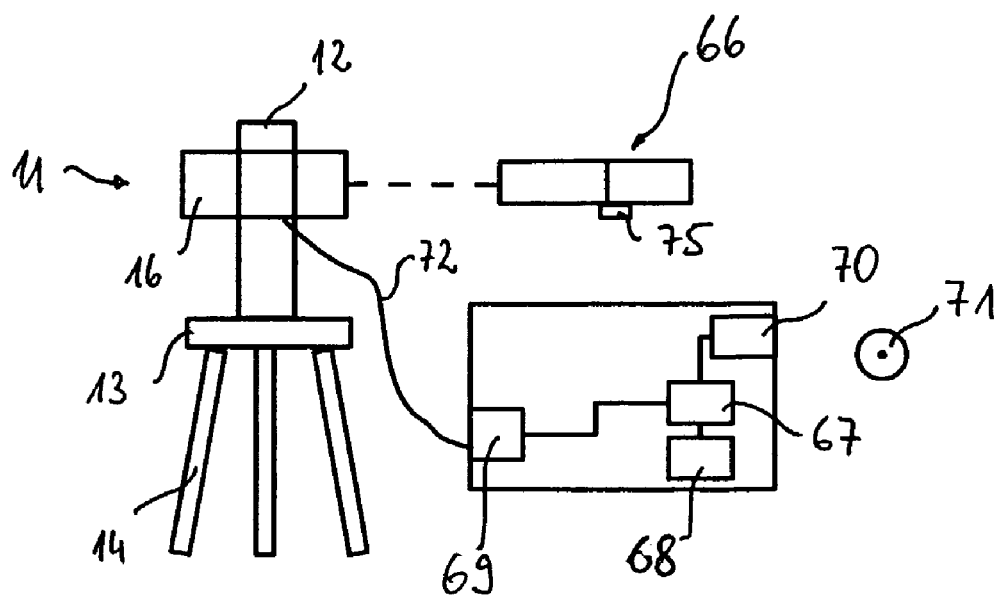
Figure 18:
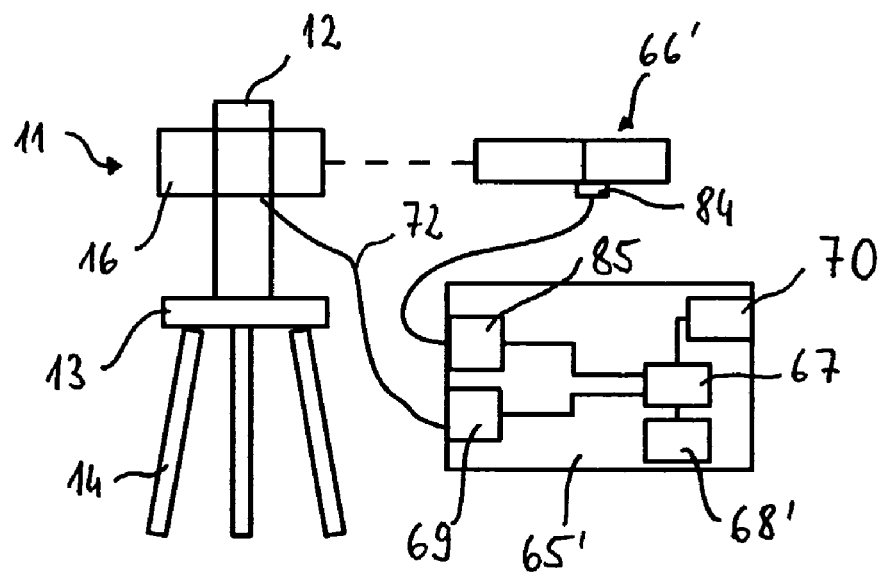
Figure 8:
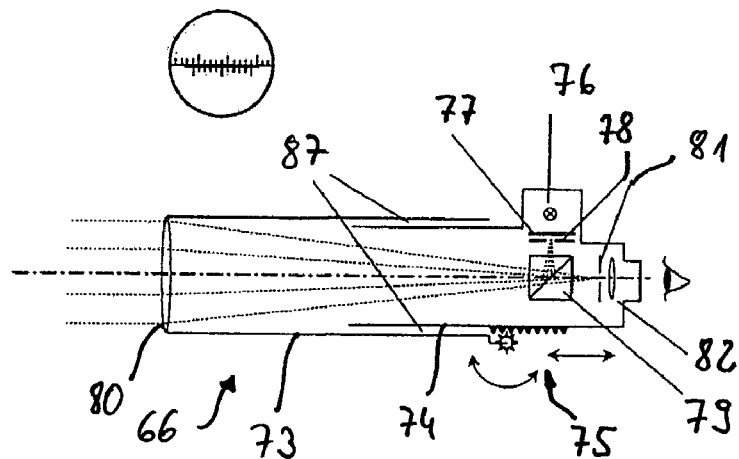
Figure 9:
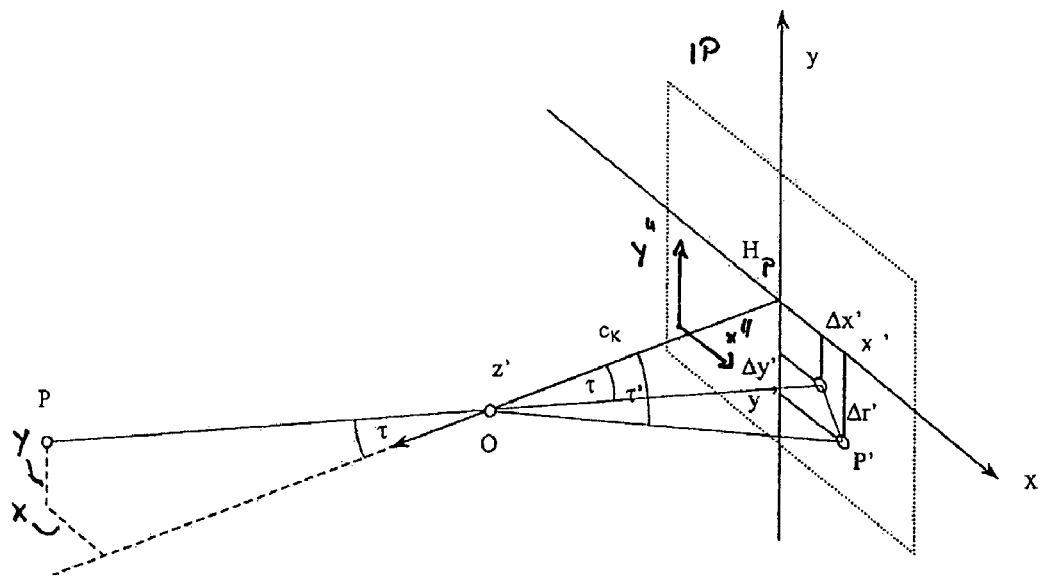
Figure 10:
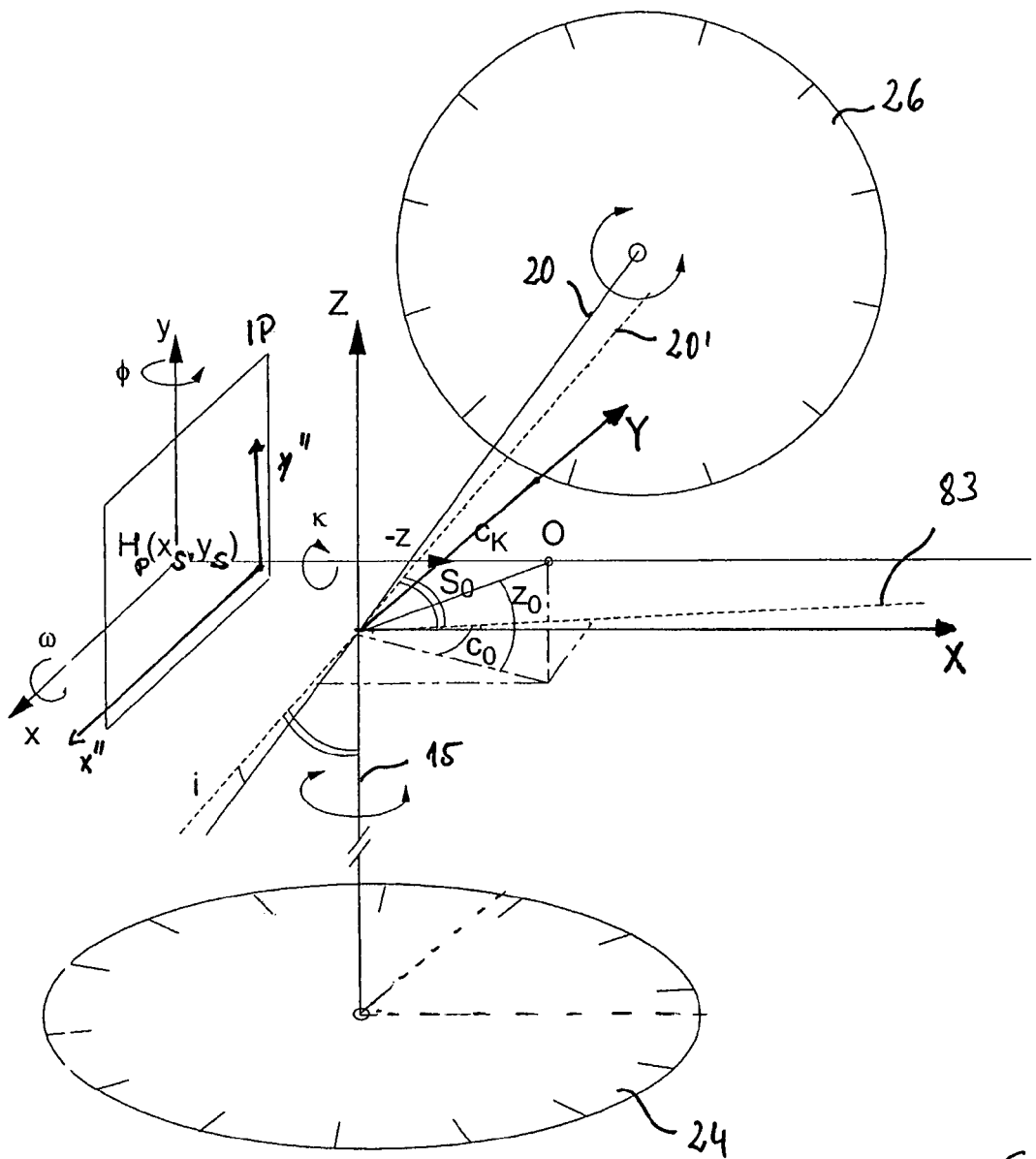
Figure 11:
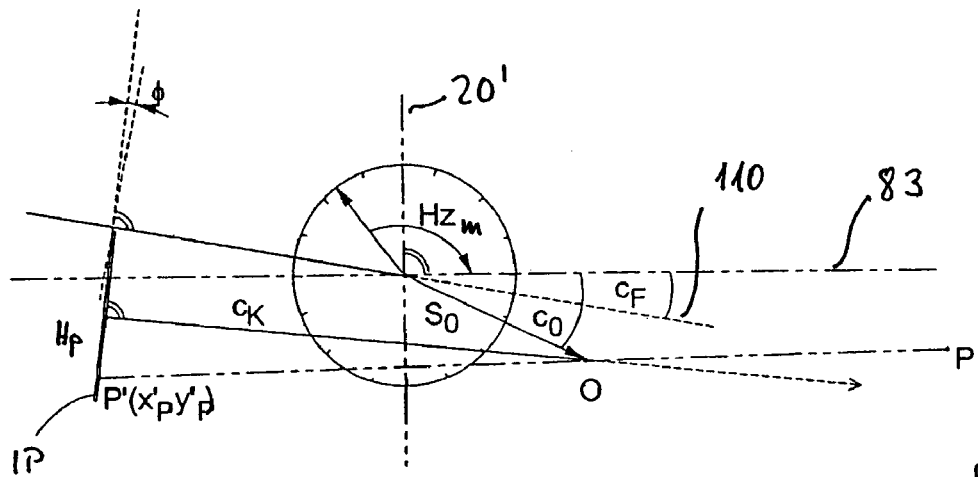
Figure 12:
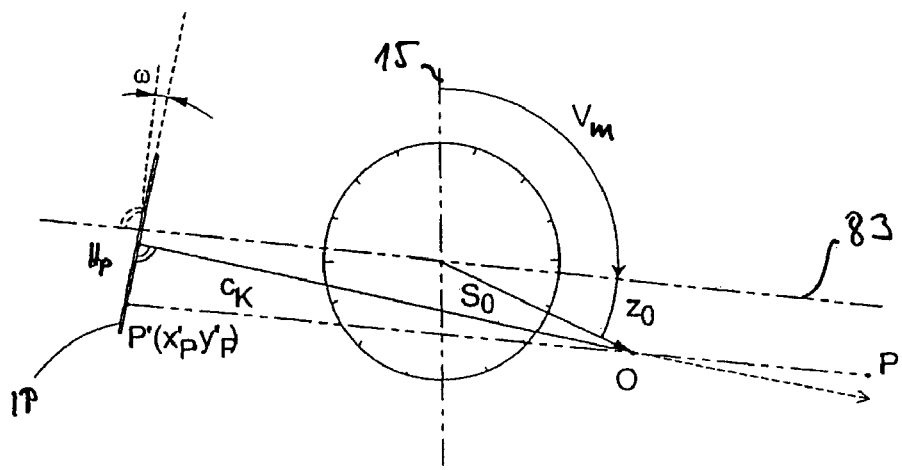
Figure 13:
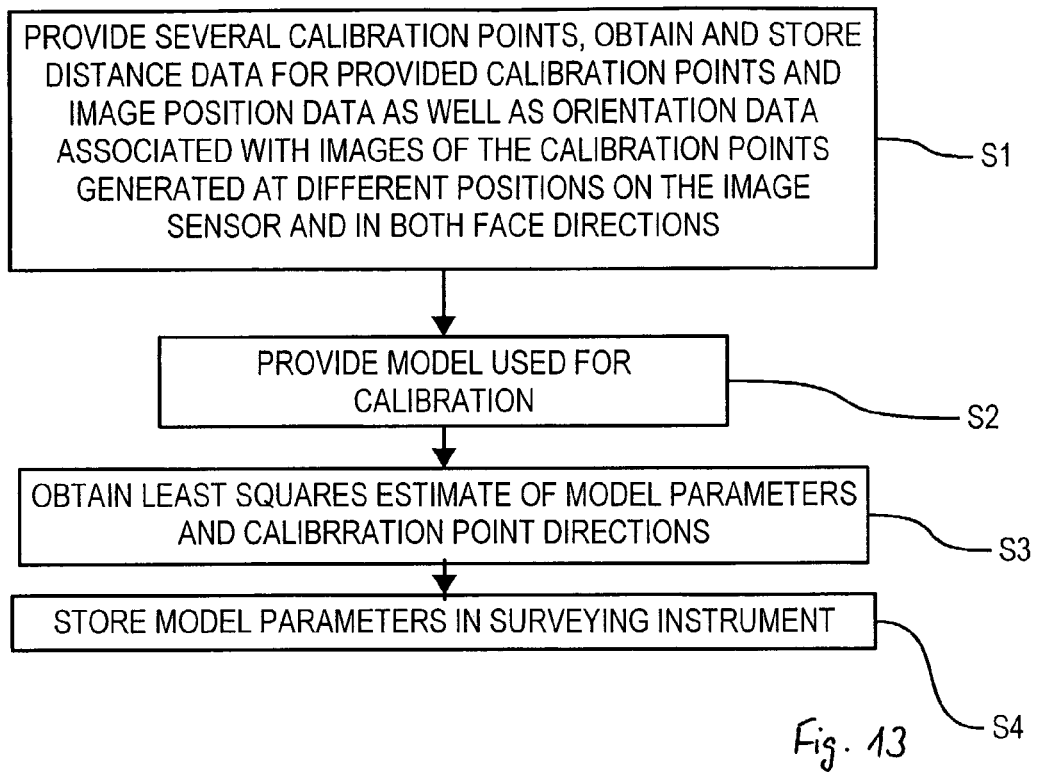
Figure 14:
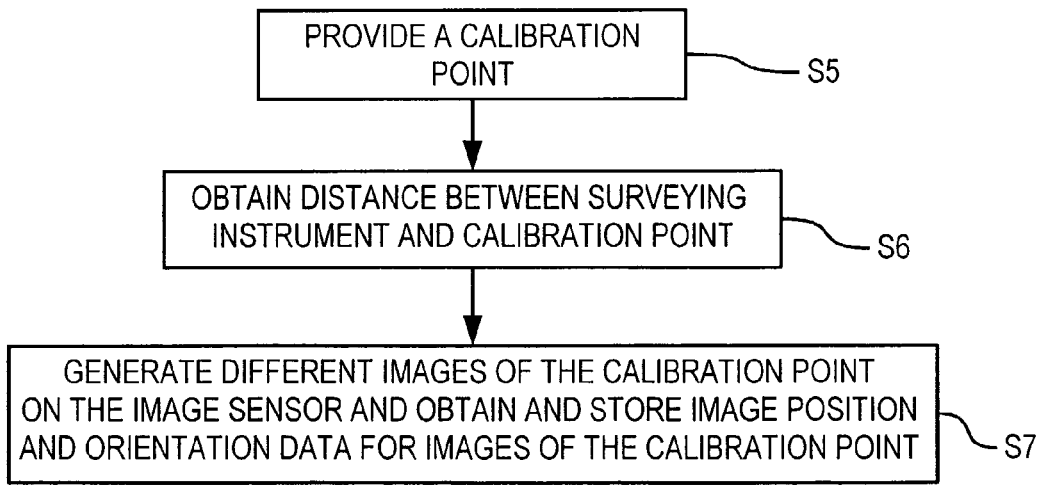
Figure 15:
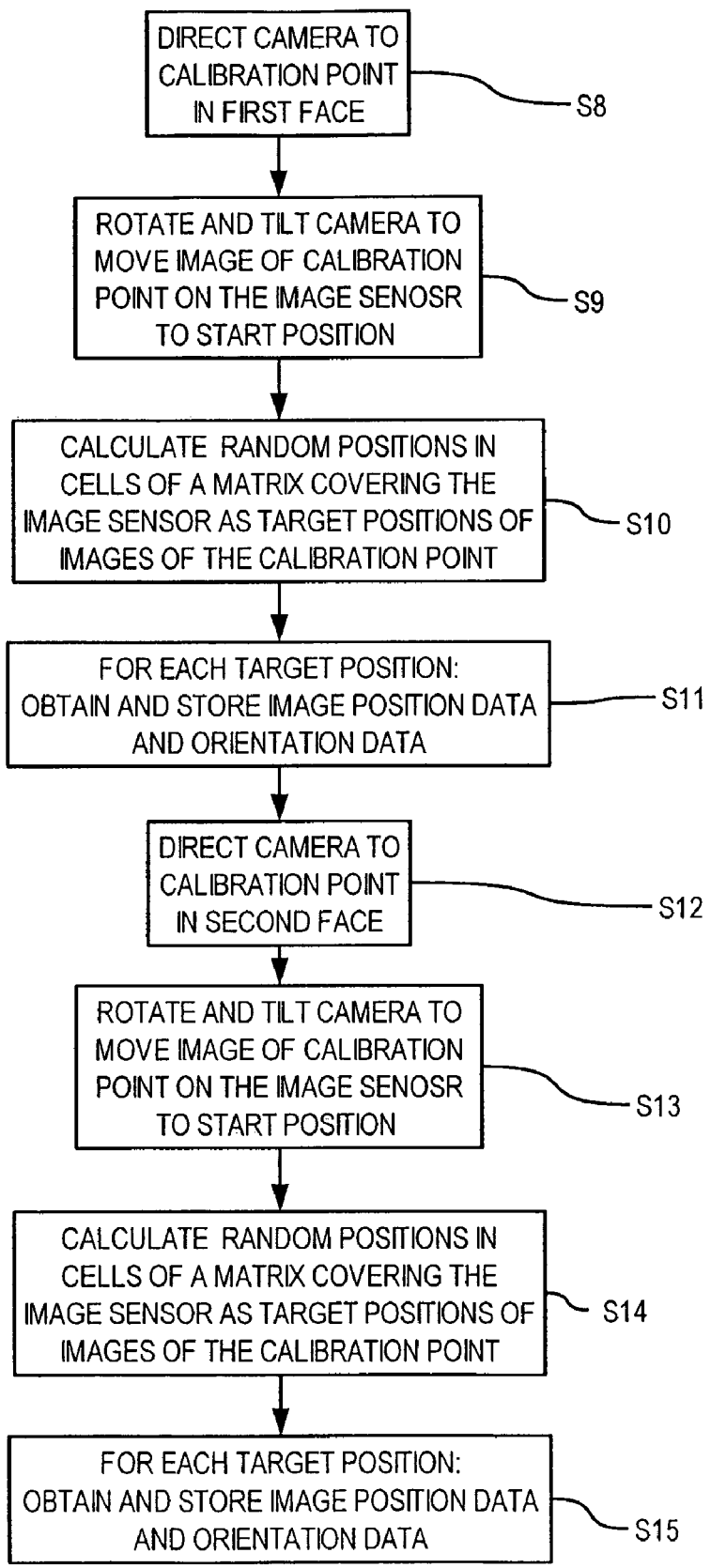
Figure 20:
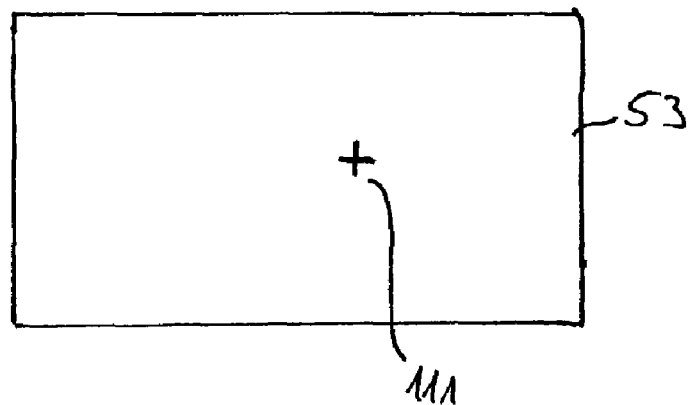
Figure 21:
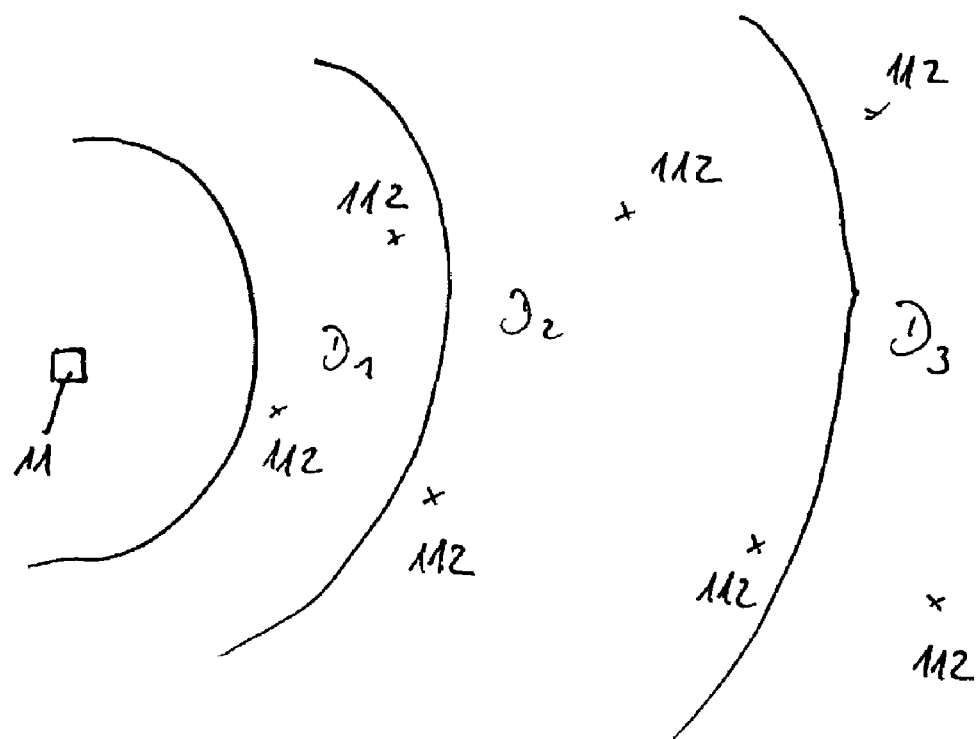
Figure 22:
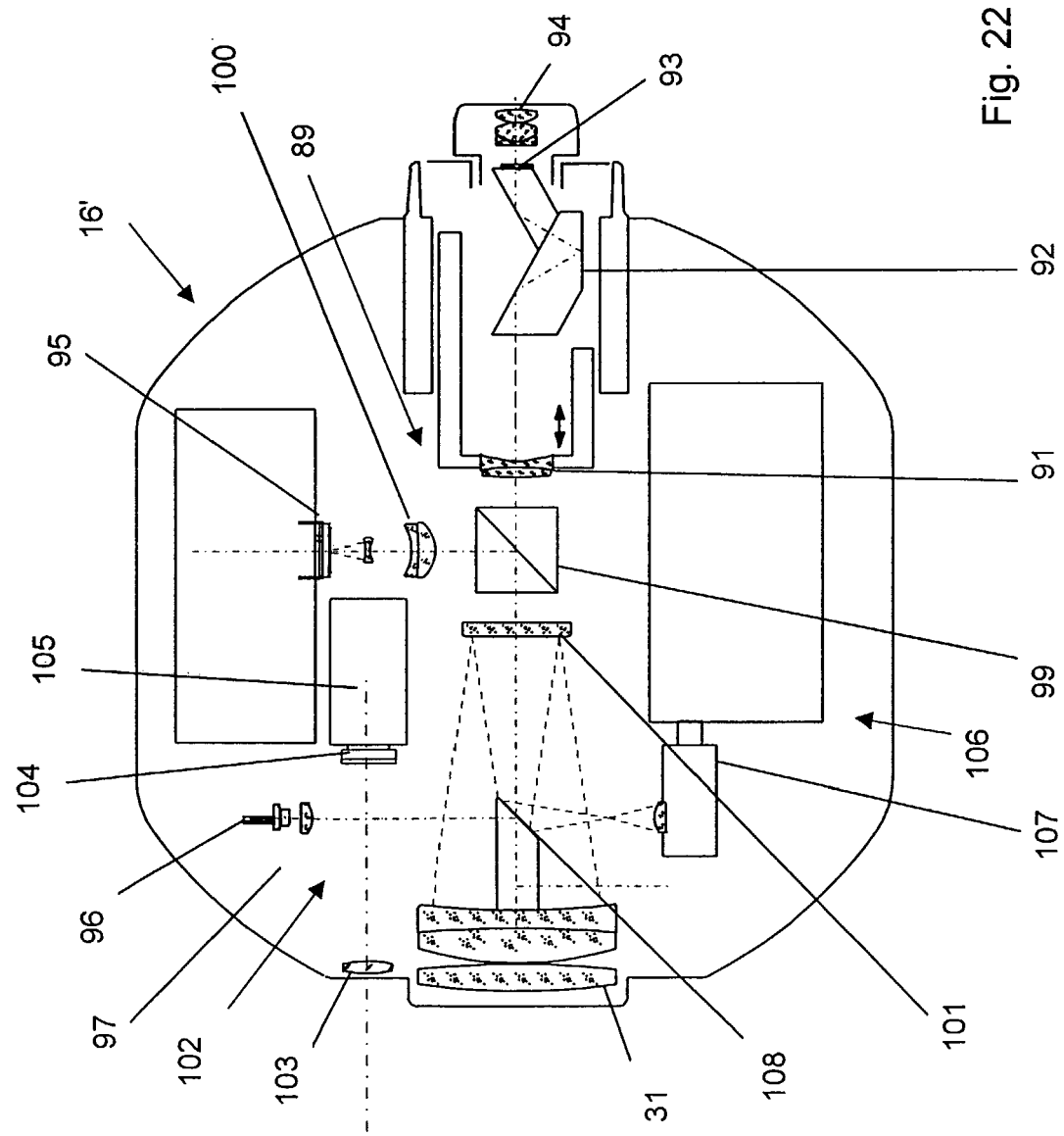
Figure 23:
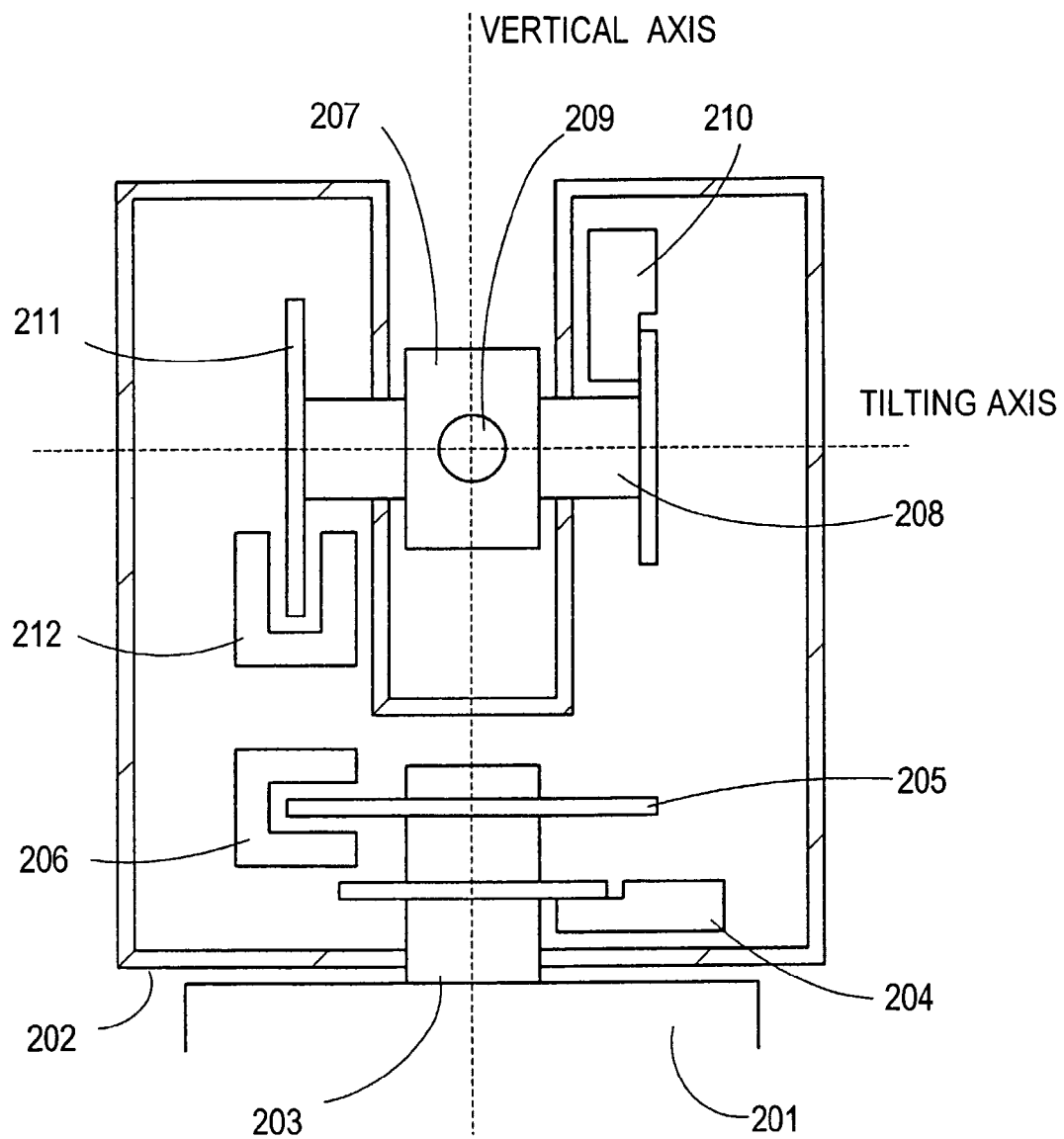
Figure 24:
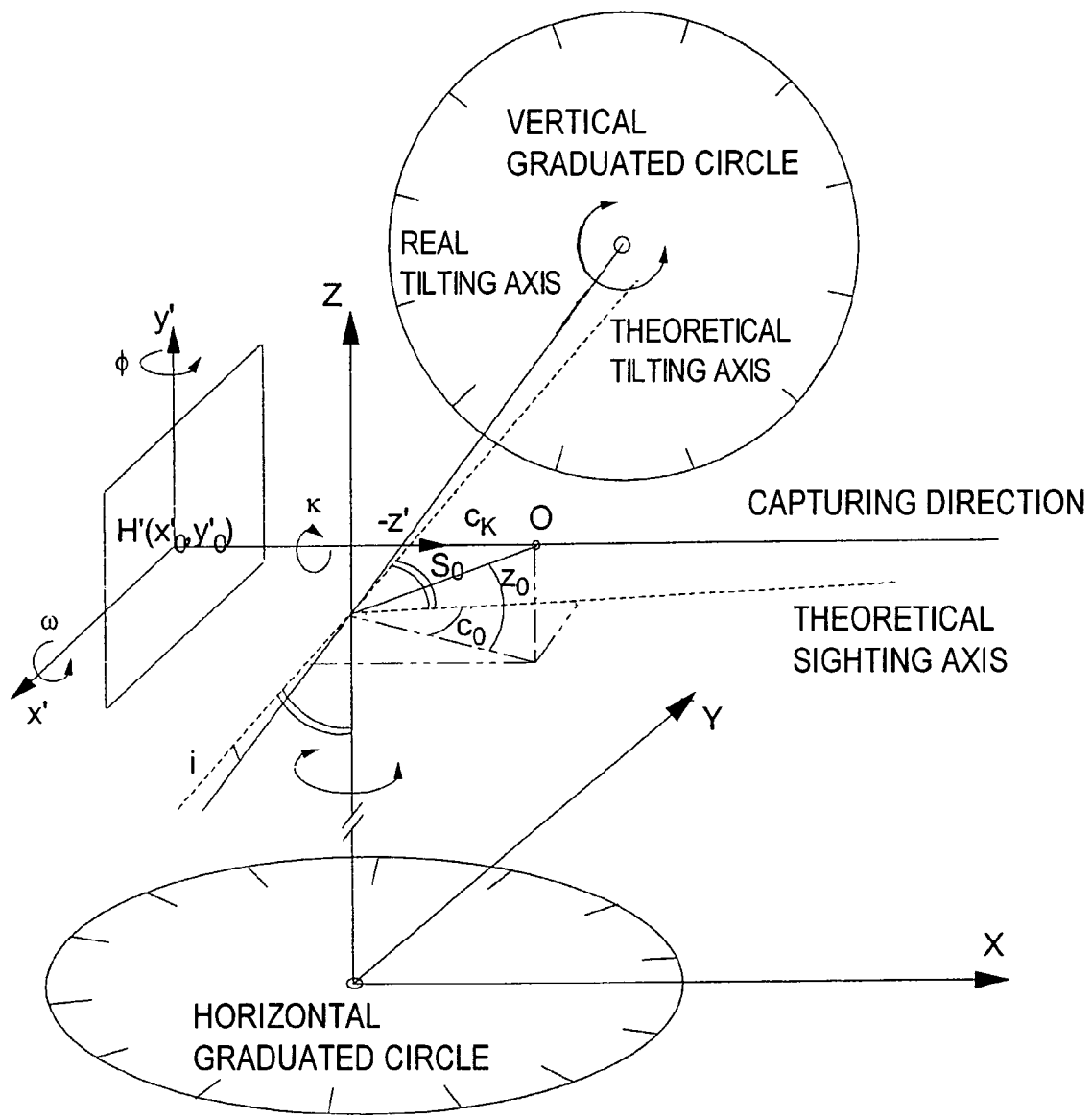
Figure 25:
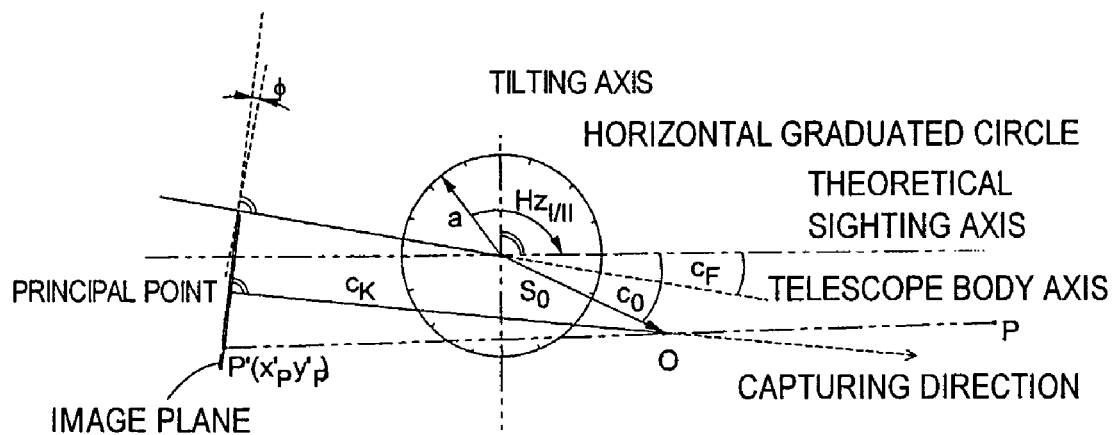
Figure 26:
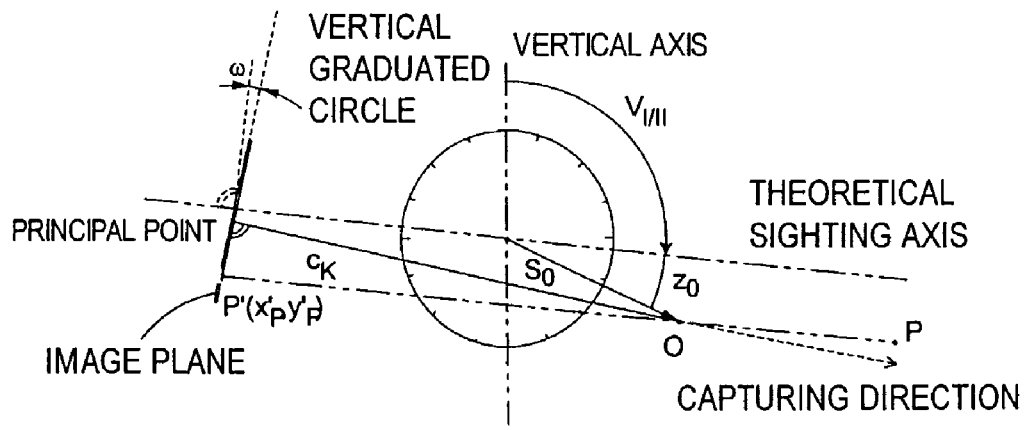

FIG. 7 schematically shows the video-tacheometer in FIG. 4 with a data processing system and an extensible collimator;

FIG. 8 shows a schematic sectional view of the collimator in FIG. 7;

FIG. 9 shows a diagram illustrating a pinhole camera model;

FIG. 10 shows a perspective diagram illustration coordinate systems and the arrangement of axes and an image plane used in a model for calibration in a method according to a first exemplary preferred embodiment of the invention;

FIG. 11 shows a top view of the arrangement in FIG. 10;

FIG. 12 shows a side view of the arrangement in FIG. 11;

FIG. 13 shows an overview of the method for calibration in form of a flow-diagram;

FIG. 14 shows a flow-diagram illustrating the generation of images of calibration points in section S1 of the method in FIG. 13;

FIG. 15 shows a more detailed flow-diagram illustrating the generation of images of a point in step S7 of the method shown in FIG. 14;

FIG. 16 shows a diagram illustrating the calculation of virtual distances of virtual image points;

FIG. 17 shows a section of a first image sensor of the video-tacheometer in FIGS. 4 to 6 and an arrangement of cells covering the section of the image sensor;

FIG. 18 show a setup for calibrating the video-tacheometer in FIGS. 4 to 6 using a method according to a second preferred exemplary embodiment of the invention;

FIG. 19 shows a diagram for illustrating the calculation of directions with respect to an instrument center;

FIG. 20 shows a schematic view of a display of the video-tacheometer in FIG. 1 and a mark indicating a photogrammetric sighting axis displayed on the display;

FIG. 21 shows a schematic diagram for explaining a method according to another exemplary embodiment of the invention;

FIG. 22 shows a schematic sectional side view of a telescope unit of another video-tacheometer, which can be calibrated by the method in FIGS. 13 to 15;

FIG. 23 schematically shows the design of yet another tacheometer;

FIG. 24 is a perspective view of the two coordinate systems and the major rotations;

FIG. 25 shows the essential relationships in a horizontal plane containing a horizontal axis; and FIG. 26 shows the essential relationships in a vertical plane containing the vertical axis.

A video-tacheometer 11 which may be calibrated by means of a first exemplary preferred embodiment of the method according to the invention is shown in FIGS. 4 to 6 in a schematic and simplified manner.

An alidade 12 is arranged on a base element 13 of a tripod 14 serving as stand for the video-tacheometer 11. The alidade 12 is rotatable about a vertical axis 15, which is oriented vertical to the ground if the video-tacheometer 11 is correctly oriented with respect to ground. The alidade 12 carries a telescope unit 16 which comprises in a housing 17, a finder camera 18 having a wide field of view and a telecamera 19. The telescope unit 16 is rotatable about a tilting axis 20, which is orthogonal to the vertical axis 15 up to a tilting axis error. Thus, the tilting axis 14 rotates with rotation of one of the cameras 18 and 19 about the vertical axis 12. A control panel 21 is removably mounted to the alidade 12. The alidade 12 may be handled by means of a handle 86

Rotation and tilting drives 22 and 23, respectively, are provided for rotating the alidade 12 about the vertical axis 15 and for tilting the telescope unit 16 about the tilting axis 20.

For measurement of an angle of rotation or of a horizontal angle about the vertical axis 15, a graduated horizontal circle 24 for the horizontal angle a sensing head 25 is provided. The horizontal circle 24 is concentric with the vertical axis 15. The sensing head 25 is held on the alidade 12 and can sense an angular position of the alidade 12 and thus of the telescope unit 16 and the cameras 18 and 19 relative to the base element 13.

For measurement of an angle of rotation, i.e. tilt, about the tilting axis 20, i. e. of the vertical angle, a graduated vertical circle 26 for the vertical angle is correspondingly mounted to the tilting axis 20 being coaxial with the tilting axis 20. A sensing head 27 for the vertical angle which is also held on the alidade 12 can sense the angular position of the telescope unit 16.

The video-tacheometer 11 further comprises an optical plummet 28 arranged in the alidade 12, which comprises a small telescope pointing downwardly in a vertical direction. An optical axis of the small telescope substantially coaxially with the vertical axis 12. Thus, the optical plummet 28 can be used to center or position the video-tacheometer 11 above a point on the ground, such as a boundary stone, for example. As an alternative an optical plummet could be used which emits a light beam downwardly in a vertical direction, the light beam being substantially coaxial with the vertical axis 12.

An inclination sensor or clinometer 29 which is also arranged in the alidade 12 measures the inclination of the alidade 12 and, thus, of the video-tacheometer 11 in two directions which are orthogonal to each other and, thus, allows to check whether the vertical axis 15 is in a true vertical direction within a given accuracy of the measurement and whether thus the tilting axis 20 is in a true horizontal direction relative to the ground up to a tilting axis error.

Three optical devices are arranged in the telescope unit 16, which is shown from the front in FIG. 4 and in a lateral, sectional view in FIG. 5. These are the finder camera 18, the telecamera 19 and a distance-measuring device 30.

The telecamera 19 comprises by an objective 31, a focusing lens 32 and a first image sensor 33. An object or object point is imaged by the objective 31 and a focusing lens 32 onto the image sensor 33, wherein for focusing the image onto the image sensor the focusing lens 32 is moved along the optical axis of the objective 31 and the focusing lens 32, as indicated by the arrows in FIG. 5. The field of view of the telecamera 19 is rather narrow and bounded by boundary rays 34 as shown in FIG. 5.

The finder camera 18 uses some of the optical elements of the telecamera 19. The finder camera 18 comprises the objective 31, a beam splitting prism 35 arranged in the optical path of the objective 31, a supplementary objective 36, a diaphragm 37 and a second image sensor 38. The combined objective formed by the objective 31 and the supplementary objective 36 focuses light from a scene captured by the finder camera 18 onto the second image sensor 38. In the combined objective, the light passing through the objective 31 is reflected by a semi reflective surface 39 of the beam splitting prism 35 towards the supplementary objective 36. The supplementary objective 36 reduces a focal length of the combined objective for the finder camera 18. The diaphragm 37 ensures an essentially focused imaging onto the second image sensor 38 for objects in a distance of more than a couple of meters, so that for the finder camera 18 no focusing lens is necessary. Due to the reduced focal length of the combined objective the field of view of the finder camera 18 (shown in FIG. 5 by the limiting rays 40) is larger than that of the telecamera 19. Preferably, the range of view of the finder camera 18 may be ten times the range of view of the telecamera 19 or more.

The first and second image sensors 33 and 38 are both CCD matrix sensors which comprise an arrangement of photo detecting elements which is to a very good approximation rectangular. Images captured by the image sensors are processed by units discussed further below.

The distance measuring device 30 comprises an optical radiation emitting/receiving unit 41, a dichroic beam splitting prism 42 having a beam splitting layer 43 and the objective 31. The emitting/receiving unit 42 emits infrared radiation which is selectively reflected by the dichroic beam splitting layer 43 towards the objective 31. The infrared radiation may then hit a reflector or a target in the terrain from where it is returned. The objective 31 focuses the returned infrared radiation to the emitting/receiving unit 41 via the beam splitting prism 42. The emitting/receiving unit 41 emits pulses of infrared radiation and measures the time of flight of the pulses from the emitting/receiving unit 41 to the target and back to the emitting/receiving unit 41 and determines from the times of flight the distance of the target from the video-tacheometer 11.

Any movements of components of the video-tacheometer 11 are effected electronically. FIG. 6 shows a block diagram in which the various functional blocks of the video-tacheometer 11 are schematically shown, including their connections to each other. The broken lines illustrate the physical units in which the respective components and devices are arranged.

A battery 44 which is arranged in the alidade 12 feeds a power supply unit 45 which serves to supply the video-tacheometer 11 with power. The power supply unit 45 supplies all components and devices in the alidade 12 and the telescope unit 6, as well as any modules connected to it, with the required operating voltages. For the sake of better overview these connecting lines are not shown. The individual components can be connected individually via separate lines as the case for components within the alidade 12 or by a central bus 46 which provides data and power supply lines between the alidade 12 and the telescope unit 16. Slip rings 47 arranged on the tilting axis 20 connect the sections of the bus 46 in the alidade 12 and the telescope unit 16.

By these slip rings 47 electric or electronic components in the telescope unit 16 can be supplied with power and can exchange data with components in the alidade 12.

Slip rings 47' arranged on the vertical axis 15 enable a power supply from outside as well as a data transfer to or from external devices via a plug, which is not shown.

For control or operation of the video-tacheometer 11, the video-tacheometer 11 is provided with the control panel 21 and operating elements 48, 49 and 50 in the form of angle encoders arranged on the alidade 12 being operable by corresponding knobs. An important electric device for controlling operation of the video-tacheometer 11 is a device-control unit 51 arranged in the alidade 12 and provided with power by the power supply unit 45.

The control panel 21 serves for communication between the operator and the video-tacheometer and is provided with a keyboard 52 for input, a display 53 for output of data and images captured by one of cameras 18 or 19, respectively, e.g. an LCD, and a computer 54 which is connected to the display 53 and the keyboard 52.

The control panel 21 is connected to the device-control unit 51 arranged in the alidade 12 and the power supply unit 45 via a releasable connection 55. Since the control panel 21 is removable, it may be equipped with its own battery, which ensures that the computer 54 continues to work even when the control panel 21 is removed from the alidade 12. The computer 54 is connected to the device-control computer 51 via a connection 56 and can perform numerous geodesic calculations by means of its program and data memories.

The operating elements 48, 49 and 50 are connected to the device-control computer 51 via a corresponding interface 57. This interface 57 allows to generate signals corresponding to a rotary position of the operating elements 48, 49 and 50, respectively, which are transmitted to the device-control unit 51.

The operating elements 48 and 49 serve for controlling rotation of the alidade 12 about the vertical axis 15 and tilting of the telescope unit 16 about the tilting axis 20, respectively. In response to signals from the operating elements 48 and 49, respectively, and the interface 57 the device-control unit 51 controls via control circuits 58 and 59 in the alidade 12 the drives 22 and 23 to rotate the alidade 12 about the vertical axis 15 and to tilt the telescope unit 16 about the tilting axis 20, respectively. Angle measurements may be used to control the drives 22 and 23.

Drives 22 and 23 do not need to be controlled solely by the operating elements 48 and 49, respectively, but can also be controlled on the basis of a program stored and executed in the device-control unit 51 or on the basis of commands sent to the device-control unit 51.

The drives 22 and 23 cooperate with the angle-measuring devices, i.e. the graduated horizontal circle 24 for the horizontal angle and the corresponding sensing head 25, or the graduated vertical circle 26 for the vertical angle and the corresponding sensing head 27, respectively, such that the alidade 12 with the telescope unit 16 can be rotated as desired about the vertical axis 15 and the telescope unit 16 can be rotated about the tilting axis 20 in a measurable manner and can be brought in to a desired horizontal and vertical angle position. This purpose is served inter alia, by the device-control computer 51, which receives signals from the sensing heads 25 and 27 and controls the control circuit 58 for the horizontal drive 22 and the control circuit 58 for the vertical drive 23 in response to said signals.

The angles which the alidade 12 is to be rotated to about the vertical axis 5 and which the telescope unit 16 is to be rotated to about the tilting axis 20 can be provided in three ways. First, the operating elements 48 and 49 allow input of corresponding angles to the device-control computer 51. Second, the device-control computer 51 can determine the angle to be set also as a function of data from other components of the video-tacheometer 11 and can accordingly control the control circuits 58 and 59, respectively. Third, corresponding data can be input to the control-device unit 51 via an interface 60, for example a RS232-interface.

A radio module 61, which is connected to the device-control computer 51 and has an antenna 62, serves to exchange data with remote devices, such as a remote control. For example, the video-tacheometer 11 can be remote-controlled by a remote control or station, which is located at the target point of the measurement, but it is not shown in the Figures.

For processing the signals of the image sensors 33 and 38, a data compression unit 63 is provided in the telescope unit 16 which compresses image data received from the image sensors 33 and 38. The compressed data can then be sent to the device-control unit 51 which may process and/or forward the data to the computer 54 and the display 53.

For controlling the position of the focusing lens 32 the operating element 50 of the same type as the operating elements 48 and 49 arranged at the alidade 12 provides signals via the interface 57 to the device-control unit 51 which in turn provides corresponding control signals to a servo control unit 64 arranged in the telescope unit 16 to drive a corresponding focusing drive for shifting the focusing lens 32. This drive is not shown in the Figures.

The device-control unit 51 is further connected to the above-mentioned optical plummet 28 and the inclination sensor 29.

The device-control unit 51 comprises a volatile memory, a non-volatile memory and a processor for executing a program stored in the non-volatile memory. The program is suited to process images obtained from the image sensors 33 and 38, respectively, and display the process images on the display 53 using the computer 54 of the control panel 21. The program comprises further a program module, which can calculate a direction of an object point an image of which was captured by the telecamera 19 as function of the position of the image of the object point on the image sensor 33 and the horizontal and vertical angles read from the horizontal and vertical circles 24 and 26. The object point may be selected by a pointing device such as a mouse, not shown in the Figures and connected to the device-control unit 51 via the computer 54.

The video-tacheometer 11 may be calibrated by means of a method for calibrating a surveying instrument according to an first exemplary embodiment of the invention using a data processing system 65 according to an first exemplary embodiment of the invention and an extensible collimator 66.

The setup is schematically shown in FIG. 7.

The data processing system 65 comprises a processor 67, a memory 68 for storing a program to be executed by the processor 67 and permanent and temporary data and an interface 69 for reading data used for calibration and sending commands to the surveying instrument to be calibrated, i.e. the video-theodolite 11. In the present embodiment, interface 69 is an RS232 interface. The data processing system 65 further comprises a reader for a storage medium, in this case a CD-ROM drive 70, to read a computer program according to a first preferred exemplary embodiment of the invention from a storage medium in the form of a CD 71 on which the computer program according to the first preferred exemplary embodiment of the invention is stored. When the computer program is read from the CD 71 by means of the CD-ROM drive 70 and stored in the memory 68 it can be executed by the processor 67 to perform the steps of the calibration method to be executed by a data processing system.

The data processing system 65 is connected to the interface 60 of the video-tachometer 11 via a connection 72, in this example a suitable cable.

The set up further contains the collimator 66 which serves to generate virtual calibration points. The collimator 66 which is shown in more detail in FIG. 8 comprises guiding tube element 73 and guided tube element 74. The guided tube element 74 is slidable in the guiding tube element 73 while being guided by the tube element 73.

The guiding tube element 73 may be mounted in a fixed position relative to the ground by mounting means not shown in the Figures. The guided tube element 74 may be slid relative to the guiding tube element 73 by means of a rack-and-pinion drive 75 to be operated by a knob not shown in FIG. 8. The position of the guided tube element 74 relative to the guiding tube element 73 may be determined by suitable measuring devices up to micrometer accuracy, e.g. by means of scales 87 engraved in the tube elements 73 and 74.

An illumination device 76 arranged in the guided tube element 74 illuminates a ground glass screen 77. The illuminated ground glass screen 77 illuminates a first cross-hair 78. A beam splitter 79 arranged in the light path of the light emitted by illumination device 76 redirects light having passed the first cross hair 78 towards an objective 80 mounted in the guiding tube element 73. The objective 80 images the cross-hair 78 as real or virtual image to a distance determined by the distance between the objective 80 and the first cross-hair 78. For calibration purposes, the first cross-hair 78 is positioned between the objective 80 and its object side focal point. The cross-hair 78 thus represents a floating mark which can be used to generate virtual calibration points.

A second cross-hair 81 is arranged on the optical axis of the objective 80 past the beam splitter 79 and may be viewed by an eyepiece 82.

For calibration of the video-tacheometer 11 with the telecamera 19 being active, a model is used which includes model parameters to be adjusted for calibration. The model comprises two submodels.

The first submodel is a model for a transformation of coordinates in a coordinate system fixed to the base element 13 to a camera coordinate system fixed to the camera, that is telecamera 19, including as parameters the horizontal and vertical angles set at the instrument and parameters relating to axis errors as mentioned in the introduction, that is a tilting axis error and some form of collimator error and vertical index error.

The second submodel is a camera model which represents the imaging of an object point by the camera onto the image sensor of the camera. In this embodiment, a pin hole model is used.

In the model, essentially two coordinate systems are used. The first coordinate system, termed instrument coordinate system, is fixed with respect to the base element 13 (see FIG. 4). It is a Cartesian coordinate system with the origin at the intersection of the vertical axis 15 and the tilting axis 20 and with the X axis, the Y axis and the Z axis being orthogonal to each other. In the case that these axes do not intersect, the point of closest approach of these axis is used as the origin of the coordinate system. The X axis and Y axis are orthogonal to the vertical axis 15 and thus horizontal, if the vertical axis 15 is perpendicular to the ground. In this coordinate system a point P has Cartesian coordinates (X, Y, Z).

Second, a camera coordinate system is used, which is fixed with respect to the camera 19. It is defined by an x-axis, a y-axis and a z-axis, all three axis being orthogonal to each other. The position of a point P can be described by the coordinates (x, y, z) in the camera coordinate system.

In the following, coordinates in the instrument coordinate system are always denoted by capital letters whereas coordinates in the camera coordinate system are always denoted by small letters.

First, the camera model is described in more detail with reference to FIG. 9.

The pinhole model used as a camera model assumes that a point P imaged by the camera onto the image sensor may be described by a projection of this point via a projection center O onto an image plane IP which is related to the image sensor 33 and may in particular be in the same plane.

Thus, the pinhole model is determined by the image plane IP and the position of the projection center O relative to the image plane. Since the position of the projection center relative to the projection center is determined by the camera optics, here the objective 31 and the focusing lens 32, the position represents optical properties of the camera and in particular imaging properties of the camera. Imaging of an object point P to the image plane is represented by a projection of the object point through the projection center O onto the image plane (see FIG. 9). The image plane is assumed to be essentially the plane of the image sensor so that the x axis and y axis of the camera coordinate system are parallel to the image plane. The z-axis of the rectangular camera coordinate system is the line through the projection center orthogonal to the image plane. Since the image is always in the image plane the position can be characterized solely by the x and y coordinates.

Let $(x,y,z)$ be the coordinates of the point P in the camera coordinate system and $(x_0, y_0, z_0)$ the projection center coordinates in the camera coordinate system. Thus, the piercing point $H_p$ of the line orthogonal to the image plane IP through the projection center O, i.e. the z-axis, has coordinates $x_0$ and $y_0$ in the x-y-plane. Further, $(x', y', z')$ denote the coordinates of the image P' of the point P generated by the camera in the image plane. If the camera optics do not create distortions, one obtains the following relationship by simple geometric arguments (see FIG. 9):

$$\frac{x' - x_0}{c_k} = \frac{x - x_0}{z - z_0}$$

$$\frac{y' - y_0}{c_k} = \frac{y - y_0}{z - z_0}.$$

Herein $c_k$ is the so-called camera constant representing the distance between the projection center and the image plane. Thus, $z'=c_k$ holds true.

The camera optics may create distortions in images, the distortions being caused to imperfections of the lenses used in the camera optics and/or their alignment. To account for first-order radial distortions another parameter v is introduced. A relative change in position of the image caused by a distortion is modeled as a constant v times the square of the radial distance of the image from the piercing point $H_P$. If the image of a point $(x, y, z)$ falls at $(x', y')$ in the image plane without the distortion the squared radial distance of the image point from the piercing point $H_P$ is $(x'-x_0)^2+(y'-y_0)^2$. Thus, distortion corrections $\Delta x'$ and $\Delta y'$ are added (see FIG. 9) which results in the equations:

$$x' = x_0 + c_k \frac{x - x_0}{z - z_0} + \Delta x'$$

$$y' = y_0 + c_k \frac{y - y_0}{z - z_0} + \Delta y'$$

with $$\Delta x' = v((x' - x_0)^2 + (y' - y_0)^2)(x' - x_0)$$

$$\Delta y' = v((x' - x_0)^2 + (y' - y_0)^2)(y' - y_0)$$

and v being a camera model parameter representing the above-mentioned first-order radial distortions of the optics of the camera.

These equations are valid only in the camera coordinate system. If the coordinates of the object point shall be expressed in the instrument coordinate system, a transformation between these coordinate systems in necessary. This is the submodel for transformation.

Generally, the transformation can be expressed by a sequence of three rotations about the coordinate system axis and a translation vector in space. Thus coordinates $p^t=(x, y, z)$ of a point P in the camera coordinate system are transformed into coordinates $P^t=(X, Y, Z)$ in the instrument coordinate system by the equation:

$$p = T + R^{-1} P$$

wherein T is a translation vector and $R^{-1}$ is the inverse of a product R of rotation matrices. Since during calibration the position of the projection center and the position and orientation of the image plane are adjusted the origin of the camera coordinate system can be chosen to be the projection center, resulting in the equation:

$$p = R^{-1}(P - O)$$

Inserting this relationship into the equations for x' and y' yields the so called collinearity equations:

$$x' = x'_0 - c_K \frac{r_{11}(X - X_0) + r_{21}(Y - Y_0) + r_{31}(Z - Z_0)}{r_{13}(X - X_0) + r_{23}(Y - Y_0) + r_{33}(Z - Z_0)} + \Delta x'$$

$$y' = y'_0 - c_K \frac{r_{12}(X - X_0) + r_{22}(Y - Y_0) + r_{32}(Z - Z_0)}{r_{13}(X - X_0) + r_{23}(Y - Y_0) + r_{33}(Z - Z_0)} + \Delta y'$$

with $$\Delta x' = v((r_{11}(X - X_0) + r_{21}(Y - Y_0) + r_{31}(Z - Z_0))^2 +$$
$$(r_{12}(X - X_0) + r_{22}(Y - Y_0) + r_{32}(Z - Z_0))^2)$$
$$(r_{11}(X - X_0) + r_{21}(Y - Y_0) + r_{31}(Z - Z_0))$$

$$\Delta y' = v((r_{11}(X - X_0) + r_{21}(Y - Y_0) + r_{31}(Z - Z_0))^2 +$$
$$(r_{12}(X - X_0) + r_{22}(Y - Y_0) + r_{32}(Z - Z_0))^2)$$
$$(r_{12}(X - X_0) + r_{22}(Y - Y_0) + r_{32}(Z - Z_0))$$

wherein $r_{ij}$, $i,j=1, \ldots, 3$ are the matrix elements of R and the coordinates of the projection center O in the instrument coordinate system are $(X_0, Y_0, Z_0)$.

Since the origin of the camera coordinate system is chosen to be the projection center and the z axis is assumed to be orthogonal to the image plane, an image position (x", y") read on the image sensor in a image sensor coordinate system having a x" axis and a y" axis being directed along rows and columns of the matrix of the CCD sensor corresponds to an image position in the camera coordinate system given by $x'=x''-x_s''$ and $y'=y''-y_s''$, with $(x_s'', y_s'')$ being the coordinates of the position of the intersection of the z axis with the image plane as measured by the image sensor, i.e. the position of the corresponding pixel on the image sensor. Thus, in the above mentioned equations x' and y' are replaced by x"−$x_s$ and y"−$y_s$.

In summary, the parameters of the camera model are the coordinates $x_s$, $y_s$ of the piercing point, the camera constant $c_k$, and the parameter v representing the distortion properties of the camera optics. Due to the definition of the camera coordinate system $x_0 = y_0 = 0$ holds true.

The transformation between the camera coordinate system and the instrument coordinate system can be derived in various ways, for example by performing successive rotations of the camera coordinate system starting from an orientation in which it coincides with the instrument coordinate system as set out below.

FIG. 10 shows the camera coordinate system with coordinate axis x, y and z, the image coordinate system with coordinates x", y" and an origin with the coordinates ($x_s"$, $y_s"$, $c_k$), the x"- and the y"-axis being parallel to the x- and y-axis, and their relation to the instrument coordinate system (X,Y,Z). In FIG. 10, the origin of the instrument coordinate system lies at the intersection of the theoretical tilting, vertical and sighting axes (i.e. in the instrument center or tacheometer center, respectively). For these theoretical axes the above-mentioned conditions are satisfied: The theoretical vertical axis 15 is assumed to be perpendicular to the ground, the angle between the theoretical tilting axis 20' and the theoretical vertical axis 15 and the angle between the theoretical sighting axis 83 and the theoretical tilting axis 20' are assumed to be right angles. All three axes intersect in one point which is the origin of the instrument coordinate system. It is further assumed that the actual vertical axis is the theoretical vertical axis. The Z axis of the instrument coordinate system coincides with the vertical axis of the instrument, and the Y axis coincides with the zero direction marked on the horizontal circle 24.

The origin of the camera coordinate system is the projection center O. However, in FIG. 10, for the sake of a better overview, the origin is shown shifted to the image plane. The principal point $H_P$, i.e. the piercing point of the line through the projection center and orthogonal to the image plane IP, has the coordinates $x_s"$ and $y_s"$ in the image coordinate system in the image plane.

As shown in FIGS. 10 to 12, the actual tilting axis 20 may deviate from the theoretical tilting axis 20' by an angle i, which is the deviation of the angle between the actual tilting axis 20 and the vertical axis 15 from a right angle. Thus, the angle i represents a tilting axis error.

Furthermore, the theoretical sighting axis 83 does not need to run through the projection center O. This deviation may be expressed by two angles $c_0$ and $z_0$. The angle co is defined in a plane given by the theoretical tilting axis 20' and the theoretical sighting axis 83 as the angle between the theoretical tilting axis 20' and the line through the projection center O and the intersection point of the theoretical sighting axis 83 and the theoretical tilting axis 20'. The angle $z_0$ is defined in a plane given by the vertical axis 15 and the theoretical sighting axis 83 as the angle between the theoretical sighting axis 83 and the line through the projection center O and the intersection point of the theoretical sighting axis 83 and the theoretical tilting axis 20'.

A deviation of an telescope axis 110, the telescope axis 110 being defined by the lens mounting of the camera lenses, from the theoretical sighting axis 83 is defined by an angle $c_F$ between the telescope axis 110 and the theoretical sighting axis 83.

The camera coordinate system may also be rotated about the axis of the instrument coordinate system by angles ω, φ, κ which are assumed to be independent of any errors and directions of the video-tacheometer 11.

The above mentioned deviations cause deviations of the actual or true horizontal and vertical angles from the respective angles as read from the horizontal and vertical circle 24 and 26, respectively.

The actual or effective angle of tilting of the camera coordinate system is given by $$V_0 = V_m + z_0$$

as can be determined from FIGS. 10 and 12. Therein $V_m$ denotes the vertical angle as read from the vertical circle 26.

The angles $c_0$ and $c_F$ have the same influence on the spherical coordinates of the projection center and actual horizontal angle, respectively, as a collimation error:

$$\frac{c_0}{\sin(V_0)} \text{ and } \frac{c_F}{\sin(V_0)}.$$

The angle i causes a deviation in the horizontal angle of $$i \cot(V_0).$$

The effective horizontal angle $Hz_{\text{eff}}$, by which the camera coordinate system is rotated about the vertical axis thus reads:

$$Hz_{\text{eff}} = Hz_m + \frac{c_F}{\sin(V_0)} + i \cdot \cot(V_0)$$

wherein $Hz_m$ denotes the horizontal angles as read from the horizontal circle 24.

A detailed derivation of these formulas can be found in Deumlich, F., Staiger, R.: "Instrumentenkunde der Vermessungstechnik", Heidelberg, Germany, 9. edition, pages 206 to 208.

The rotation matrix $R^{-1}$ can be obtained by considering the following sequence of rotations of the camera coordinate system starting in an orientation in which it coincides with the instrument coordinate system.

First, the camera coordinate system is rotated about the vertical axis by the effective horizontal angle $Hz_{\text{eff}}$. The corresponding coordinates in the rotated coordinate system may be obtained by the rotation matrix $$R_\kappa^{-1}(Hz_{\text{eff}}) = \begin{bmatrix} \cos(-Hz_{\text{eff}}) & \sin(-Hz_{\text{eff}}) & 0 \\ -\sin(-Hz_{\text{eff}}) & \cos(-Hz_{\text{eff}}) & 0 \\ 0 & 0 & 1 \end{bmatrix}.$$

The tilting axis error is accounted for by a rotation about the y-axis of the transformed, i.e. rotated, camera coordinate system by the angle i.

The corresponding coordinate transformation is given by the rotation matrix $$R_\phi^{-1}(i) = \begin{bmatrix} \cos(i) & 0 & \sin(i) \\ 0 & 1 & 0 \\ -\sin(i) & 0 & \cos(i) \end{bmatrix}$$

Now, the camera coordinate system rotated twice is further rotated about the x-axis of the twice rotated camera coordinate system by the effective vertical angle $V_0$. Taking into account that in geodesy the vertical angle is measured from the zenith the corresponding rotation matrix for the coordinate transformation reads:

$$R_\omega^{-1}(V_0) = \begin{bmatrix} 1 & 0 & 0 \\ 0 & \cos(200gon - V_0) & -\sin(200gon - V_0) \\ 0 & \sin(200gon - V_0) & \cos(200gon - V_0) \end{bmatrix}$$

In a fourth step, the camera coordinate system as rotated so far is rotated further by the angle $c_F$ about the current y axis. The corresponding coordinate transformation can be written in terms of the rotation matrix $$R_\phi^{-1}(c_F) = \begin{bmatrix} \cos(c_F) & 0 & \sin(c_F) \\ 0 & 1 & 0 \\ -\sin(c_F) & 0 & \cos(c_F) \end{bmatrix}.$$

Finally, the camera coordinate system obtain by the last rotation is rotated about the x axis by an angle ω, about the y axis by an angle φ and about the z axis by an angle κ. The corresponding rotation matrix reads $$(R_\omega(\omega) \cdot R_\phi(\phi) \cdot R_\kappa(\kappa))^{-1} =$$

$$\begin{bmatrix} \cos(\phi)\cos(\kappa) & -\cos(\phi)\sin(\kappa) & \sin(\phi) \\ \cos(\omega)\sin(\kappa) + \sin(\omega)\sin(\phi)\cos(\kappa) & \cos(\omega)\cos(\kappa) - \sin(\omega)\sin(\phi)\sin(\kappa) & -\sin(\omega)\cos(\phi) \\ \sin(\omega)\sin(\kappa) - \cos(\omega)\sin(\phi)\cos(\kappa) & \sin(\omega)\cos(\kappa) + \cos(\omega)\sin(\phi)\sin(\kappa) & \cos(\omega)\cos(\phi) \end{bmatrix}$$

The complete rotation matrix having matrix elements $r_{ij}$, $i,j = 1, \ldots, 3$ thus reads $$R = R_\kappa(Hz_K) \cdot R_\phi(k_0) \cdot R_\omega(V_0) \cdot R_\phi(c_F) \cdot R_\omega(\omega) \cdot R_\phi(\phi) \cdot R_\kappa(\kappa).$$

From FIG. 10, the coordinates of the projection center O in the instrument coordinate system can be written as $$O = \begin{bmatrix} X_0 \\ Y_0 \\ Z_0 \end{bmatrix}$$

$$= \begin{bmatrix} S_0 \cdot \sin(V_m + z_0) \cdot \sin\left(Hz_m + \frac{c_0}{\sin(V_m + z_0)} + i \cdot \cot(V_m + z_0)\right) \\ S_0 \cdot \sin(V_m + z_0) \cdot \cos\left(Hz_m + \frac{c_0}{\sin(V_m + z_0)} + i \cdot \cot(V_m + z_0)\right) \\ S_0 \cdot \cos(V_m + z_0) \end{bmatrix}$$

wherein $S_0$ denotes the distance of the projection center from the origin of the instrument coordinate system.

Thus, the complete transformation is given by the rotation matrix R and the position of the projection center. The transformation parameters used in the transformation, i.e. the transformation parameters parameterizing the transformation, are i, $c_0$, $c_F$, $z_0$, $S_0$, ω, φ and κ. The transformation also depends on the horizontal and vertical angles $Hz_m$ and $V_m$ as read on the horizontal circle.

Using the collinearity equations and the coordinate transformation it is possible to calculate the positions x" and y" of an image of an object point which has spherical coordinates Hz, V and S and thus Cartesian coordinates (S cos(Hz) sin(V), S sin(Hz) sin(V), S cos(V)) in the instrument coordinate system and which is imaged at horizontal and vertical angles $Hz_m$ and $V_m$ using the camera model parameters and the transformation parameters:

$$x'' = x_s' - c_K \frac{r_{11}(X - X_0) + r_{21}(Y - Y_0) + r_{31}(Z - Z_0)}{r_{13}(X - X_0) + r_{23}(Y - Y_0) + r_{33}(Z - Z_0)} + \Delta x'$$

$$y'' = y_s' - c_K \frac{r_{12}(X - X_0) + r_{22}(Y - Y_0) + r_{32}(Z - Z_0)}{r_{13}(X - X_0) + r_{23}(Y - Y_0) + r_{33}(Z - Z_0)} + \Delta y'$$

with $$\Delta x' = v((r_{11}(X - X_0) + r_{21}(Y - Y_0) + r_{31}(Z - Z_0))^2 +$$
$$(r_{12}(X - X_0) + r_{22}(Y - Y_0) + r_{32}(Z - Z_0))^2)$$
$$(r_{11}(X - X_0) + r_{21}(Y - Y_0) + r_{31}(Z - Z_0))$$

$$\Delta y' = v((r_{11}(X - X_0) + r_{21}(Y - Y_0) + r_{31}(Z - Z_0))^2 +$$
$$(r_{12}(X - X_0) + r_{22}(Y - Y_0) + r_{32}(Z - Z_0))^2)$$
$$(r_{12}(X - X_0) + r_{22}(Y - Y_0) + r_{32}(Z - Z_0))$$

The above equations can be written for brevity, as $$x'' = U_x(i, c_0, c_F, z_0, \omega, \phi, \kappa; S_0, c_K, x_S, y_S, v; S, V_m, Hz_m) \text{ and}$$

$$y'' = U_y(i, c_0, c_F, z_0, \omega, \phi, \kappa; S_0, c_K, x_S, y_S, v; S, V_m, Hz_m).$$

The method according to the first preferred embodiment of the invention is described with reference to FIGS. 13 to 15.

The method may be subdivided into four major sections.

In the first section S1, calibration data are obtained by means of the collimator 66, the data processing system 65 and the video-tacheometer 11.

By means of the collimator 66 several virtual calibration points $P_i$, $i = 1, \ldots, N$, N being a positive integer number, are provided. Distance data for these virtual calibration points are obtained by measuring the distance between the cross-hair 78 and the objective 80 along the light path and the distance between the objective lens 80 and the video-tacheometer 11. Further, for each calibration point images of the calibration point are generated in different positions and the image sensor and corresponding image position data representing the position of the images on the image sensor as well as orientation data representing corresponding horizontal and vertical angles are obtained in both faces of the video-tacheometer 11. Some of the steps are carried out by means of the computer program in the data processing system 65

In a second section S2, a model is provided which is used for calibration, which in this example is the above-mentioned model. The model is provided in the form of program code of the computer program executed in the data processing system 65.

In a third section S3, values for the model parameters and data representing directions associated with the calibration points in the instrument coordinate system are estimated using a least squares estimate method. All steps in this section are also performed by means of the computer program in the data processing system 65.

In a fourth section S4, the obtained model parameters are stored in the surveying instrument, that is the video-tacheometer 11, to be used therein to calculate for a given position on the image sensor a corresponding direction in the instrument coordinate system and if the distance of a point imaged onto the image sensor 33 from the video-tacheometer is known, also corresponding Cartesian coordinates.

In section S1, for each calibration point, i.e. N times, the steps shown in FIG. 14 are executed.

First, in step S5 a new calibration point is provided by generating a virtual image of the cross-hair 78 in the collimator 68 by changing its position with respect to the objective 80. For that purpose, the cross-hair 78 has to be moved between the focal point of the objective 80 and the objective 80 by the distance $\Delta f$.

In step S6, the distance D between the surveying instrument, that is the video-tacheometer 11, and the virtual calibration point is obtained. In FIG. 16 illustrates the calculation. In this Figure the first cross-hair 78 is shown on the optical axis of the objective 80 for simplicity. For calculating the distance D, the distance s of the virtual image of the cross-hair 78 from the objective 80, more precisely the principal plane H of the objective 80 on the video-tacheometer side, is calculated from the focal length f of the objective 80 and the distance $\Delta f$ of the cross-hair 78 from the focal point of the objective 80 by means of the formula:

$$s = f \frac{(f - \Delta f)}{-\Delta f}$$

The virtual image distance s is then added to the distance $S_{Th/H}$ between the objective 80, that is its above-mentioned principal plane H and the vertical axis of the surveying instrument, that is the video-tacheometer 11.

On the data processing system 65 the computer program according to the first exemplary embodiment of the invention is started and first requires to input the positive integer number N via a display and a keyboard not shown in the Figures. After inputting the integer N the program requests input of the distance data associated with the first calibration point. After input of these data, the processor 67 stores the data in the memory 68 of the data processing system. In another embodiment, the number N could be pre-set in the computer program, so that no user interaction is necessary.

In step S7, for the given calibration point different images are generated on the image sensor 33 and corresponding image position data and orientation data are obtained and stored in the data processing system 65.

The generation of images of the calibration point as well as the generation of the data required for calibration are shown in more detail in FIG. 15.

The step S8, shown in FIG. 15, is performed for the first calibration point. For the following calibration points, this step needs to be performed only when necessary at least in the case that a collimator is used to provide the calibration points and that the orientation of the collimator relative to the surveying instrument, that is the video-tacheometer 11, remains unchanged except for re-orientations of the telescope unit 16, that is the camera 19. In this step the camera 19 is directed to the calibration point generated. In this embodiment, it is sufficient that an image of the calibration point appears on the image sensor 33.

Further, the camera is brought into a first face, which means, that the vertical angle of the camera 19 is between 0 and 200 gon, 0 being the zenith as determined by the vertical circle 26.

Next, in step S9, the camera 19 is rotated and tilted to move the image of the calibration point on the image sensor 33 to a predetermined start position on the image sensor 33. Preferably the starting position is situated close to one of the corners of the image sensor 33. For this purpose, the computer program stored in the data processing system 65 comprises a program module for object recognition in images such as images captured by the image sensor 33. In the memory 68 of the data processing system 65 a template is stored which represents the cross-hair 78. By use of known object recognition techniques, for example a template matching algorithm, the position of the image of the calibration point in the captured image, that is on the image sensor 33, is obtained. The computer program now calculates whether the camera 19 should be rotated by a given increment about the vertical axis 15 and/or tilted about the tilting axis 20 in order to bring the image of the calibration point closer to the start position. It then issues a corresponding command to the surveying instrument, in which the device-control unit 51 receives the corresponding commands and moves the camera 19 by the respective angles by means of the drives 22 and/or 23. Then a new image is captured and the process is repeated, until the image of the calibration point reaches the start position. Thereby, the size of the angle increments can be reduced as the image of calibration point approaches the start position.

In step S10, the program calculates random positions in cells of a matrix covering the image sensor as target positions of images of the calibration point. For that purpose, the image sensor is divided into an L×M matrix with predetermined positive integer numbers L and M and the geometric centers of the cells are calculated. In FIG. 17, cells 88 are arranged in a rectangular array covering the image sensor 33. The geometric centers of the cells are marked by crosses. For each of the geometric centers a for each direction in the matrix a random number is determined using a pseudo random number generator, the magnitude of the random number being less than half the size of the cell in the corresponding direction and then added to the coordinate of the geometric center in the respective direction. The resulting random positions in each of the cells are shown in FIG. 17 by open circles. This use of random numbers reduces the effects of defective photo detecting elements in the image sensor drastically, because it can be avoided that an image position is always on a defective pixel. These positions are stored in the memory 68 of the data processing system 65.

In step S11, the telescope unit 16 and thus the camera 19 is rotated and tilted to move the image of the calibration point on the image sensor 33 to the target position. For that purpose the same algorithm may be used as in step S9. Once the image of the calibration point has reached the target position, the image position data, that is the coordinates x" and y" of the image in the image plane, are stored and the orientation data, that is the horizontal angle $Hz_m$ and the vertical angle $V_m$ as determined by the horizontal and vertical circle, respectively, are read from the surveying instrument in response to corresponding commands sent from the data processing system 65 to the surveying instrument.

After the image position data and orientation data are stored for each target position, in step S12, the camera 19 is directed to the calibration point in the second face, that is the vertical angle as determined by means of the vertical circle is between 200 and 400 gon. In order to ensure that an image of the calibration point will appear on the image sensor 33 also in the second face, the camera is preferably rotated by 200 gon about the vertical axis 5 and then tilted by 400 gon minus the vertical angle obtained for the last target position in step S11.

The following steps S13 and S14 correspond to steps S10 and S11, the only difference being that the camera 19 is in the second face.

Once step S15 is performed for the last of the calibration points, the model used for calibration is provided in step S2. For that purpose, the computer program stored in the data processing system comprises corresponding instructions representing the model as set out above.

The steps of section S3 are executed by means of the computer program. Once for each calibration point $P_i$, i=1, ..., N Q images j, j=1, ..., Q, Q being an positive integer number, are generated and corresponding image position and orientation data are obtained by reading these data, the model parameters are adjusted so that the model predicting the position of images of the calibration points as a function of the model parameters, directions of the calibration points in the instrument coordinate system and the respective orientation data fits the measured image position data. The estimation method, a least squares estimate, which is equivalent to a classic adjustment method by least squares, is based on the error function $E(i, c_0, c_F, z_0, \omega, \phi, \kappa; S_0, c_k, x_s, y_s, v; \{S_l, \{x''_{lj}, y''_{lj}, V_{mlj}, Hz_{mlj}\}\})$ given by the following sum over all calibration points i and all images j of the calibration points $$E = \sum_{i=1}^{N} \sum_{j=1}^{Q} [$$

$$(x''_{lj} - U_x(i, c_0, c_F, z_0, \omega, \phi, \kappa; S_0, c_K, x_S, y_S, v; S_l, V_{mlj}, Hz_{mlj})^2 +$$

$$(y''_{lj} - U_y(i, c_0, c_F, z_0, \omega, \phi, \kappa; S_0, c_K, x_S, y_S, v; S_l, V_{mlj}, Hz_{mlj})^2].$$

Herein $S_l$, $\{x''_{lj}, y''_{lj}, V_{mlj}, Hz_{mlj}\}$ denote the distance for the calibration point I and the data sets j=1, ..., Q for all images of the calibration point, the data set for image j comprising the image position data $x''_{lj}$, $y''_{lj}$ and the vertical and horizontal angles $V_{mlj}$, $Hz_{mlj}$ set.

The error function E is minimized using a suitable minimization procedure, for example a Gauss-Newton algorithm as described in Benning, Wilhelm: "Statistik in Geodäsie, Geoinformation und Bauwesen", Heidelberg, Germany, 2002, ISBN 3-87907-383-X pp. 140.

In section S4, the data obtained by the computer program are stored in the surveying instrument. For that purpose the data processing system 65 sends these data via the interface 69 and the connection 72 to the surveying instrument, i. e. the video-tacheometer 11, which stores these data in the non-volatile memory of the device-control unit 51 in which also instructions of a computer program are stored representing the model used for calibration.

The performance of the method may be exemplified by the following example. In this example a variant of the method described above is used in which, however, for each angle combination more than one measurement is made. For calibrating a camera having a focal length of 300 mm and a fixed focus at 100 m, fitted to an instrument having an angle measuring accuracy of 1", one can use three calibration points at distances of, e.g., 20 m, 80 m and 500 m, and a total of 48 angle combinations per telescope position, arranged in a grid of 8×6 positions, for example. If 30 measurements per angle combination in which no random deviation is greater than 0.05 pixels, are made and the corresponding data used, the instrument can be calibrated to an accuracy of direction measurement of approximately 1" in the vertical and horizontal directions. Thus, the method is also suited for calibration of cameras having a relatively large focal length.

Using the model, from image position data of an image of an object point on the image sensor, a direction of the object point with respect to the instrument coordinate system can be calculated (see FIG. 19). Using the equation $$P'_T = \vec{O} + R \cdot \begin{bmatrix} x'_P - \Delta x' - x''_S \\ y'_P - \Delta y' - y''_S \\ -c_K \end{bmatrix}$$

in which $\vec{O}$ denotes a vector from the origin of the instrument coordinate system to the projection center O, one can transform measured image position data $x'_P$, $y'_P$ corresponding to an imaged object point P into the coordinate system of the instrument, i.e. video-tacheometer 11. $P_T'$ is a vector in the instrument coordinate system representing a direction corresponding to the measured image positions. The projection center O and the point $P_T'$ are both known in terms of coordinates with reference to the surveying instrument, and define an imaging ray a on which an object point being imaged to the position on the image sensor represented by $x'_P$, $y'_P$. As ray does not need to intersect the video-tacheometer center, i.e. the origin of the instrument coordinate system, a distance (approximate distance) of the object point P from the video-tacheometer center must be given for the correct calculation of a direction with respect to the video-tacheometer center. This distance is used as a radius of a sphere extending around the video-tacheometer center, i.e. the origin of the instrument coordinate system, and intersected by the imaging ray a. In this way, two coordinate triplets are obtained, which can be used for direction computation, depending on the position of the telescope unit 16 that has the function of a camera. The closer the video-tacheometer center is to the imaging ray, the less dependent this method becomes from the distance given.

With the camera calibration thus performed, it is also possible to define a photogrammetric sighting axis as the straight line connecting the projection center O with the instrument center formed by the intersection of the tilting axis and the vertical axis. In FIG. 19, the photogrammetric sighting axis, shown as a dashed line, is a line coaxial with the vector $\vec{O}$ as the instrument center is the origin of the coordinate system. This photogrammetric sighting axis is not identical, though, with the actual sighting axis shown in FIG. 11. The piercing point of the photogrammetric sighting axis in the image plane determines the position of a crosshair, at which the classical errors of lateral and vertical collimation are constant along the distance. Unless they were determined during parameter estimation, the lateral and vertical deviations of the projection center can be measured with the pixel at which the classical errors of lateral and vertical collimation do not change along the distance.

If an object point is sighted at with cross-hairs defined in this way, the cross-hairs, the tacheometer center, the projection center O and the object point P would lie on a straight line, this straight line being identical with a photogrammetric imaging ray.

In the computer 54 of the video-theodolite 11, program code may be stored to display a mark 111, e.g. cross-hairs, indicating the photogrammetric sighting axis on the display 53 (see FIG. 20), the computer thus representing a control unit for controlling the display. The corresponding position on the display 53 can be calculated either from the calibration parameters, which are stored in the instrument, or can be calculated once and then be stored permanently in the instrument, e.g. a non-volatile memory of computer 54.

The position of the crosshairs, defined in conventional instruments as the point in the image plane at which the lateral and vertical collimation errors are equal to zero, can, in the same way, be assigned to a pixel on the camera's detector surface; with optical components less well centered, this pixel may, in the worst case, vary with distance.

The finder camera 18 may also be calibrated using the method described in the first exemplary embodiment, data-processing system, collimator and computer programs. As the position of the projection center may be seen as just a set of parameters in the model, the fact that the light path is not straight does not require the modification of the calibration method. This one important advantage of the invention.

In a second exemplary embodiment of the invention the method differs from the method described in the first exemplary embodiment in that a more detailed model for the distortions of the camera is used in which also terms are used which are of higher order and/or not radial-symmetric. Luhmann, Thomas: "Nahbereichsphotogrammetrie: Grundlagen, Methoden und Anwendungen", Heidelberg, Germany, 2000, ISBN 3-87907-321-X, pp. 119 to 122 disclose corresponding amendments to the model described above.

In third exemplary embodiment of the invention, a system for calibration schematically shown in FIG. 18 is used. This system allows an essentially automatic calibration of an instrument. The system comprises a collimator 66' which differs from the collimator 66 in that the mark, i.e. the cross-hair 78, may be moved by an electric drive 84 which is controlled via a data processing system 65'. The data processing system 65' differs from the data processing system in that it comprises another output interface 85 for outputting commands to the drive 84 of the collimator. Further, the computer program stored in memory 68' contains program code, which, when run on the processor 67 lets the processor 67 issue control commands via the output interface 85 to the drive 84 to move the cross-hair 78 into predetermined positions and to calculate the corresponding virtual distance of the virtual calibration point.

First, a user brings the instrument in predetermined, e.g. marked, position relative to the collimator 66', in which a virtual image cross-hair 78 can be imaged to the image sensor 33. The position is determined in dependence on the properties of the collimator and of the camera and chosen such that virtual calibration points can be provided by moving the cross-hair 78. In another variant, a mount may be used to position the instrument in the predetermined position.

Then, the data processing system 65' automatically carries out all steps of sections S1 to S4 issuing commands to the surveying instrument 11, if necessary, receiving image position data and corresponding orientation data from the surveying instrument 11, and performing the calculations in step S6 and in section S3.

In a variant of this embodiment, the distances of the calibration points can be stored with the respective positions of the mark, so that the distance of the virtual image of the mark does not need to be calculated for each calibration.

In another exemplary embodiment, the possible range of distances of a target from the instrument is divided into a predetermined number G of distance subranges. The number of the distance subranges and their actual limiting values may be chosen in dependence on the optical properties of the camera, in particular the camera optics and its focal length.

In each distance subrange the same model is used, however, the camera model parameters camera constant $c_K$, the distortion parameter v, and the offsets $x_s$ and $y_s$ are defined as model parameters specific for each distance subrange. This situation is illustrated in FIG. 21, in which around the surveying instrument 11 G=3 different distance ranges $D_1$, $D_2$ and $D_3$ are partially shown. Actually, distance subrange $D_3$ extends to infinity. Each distance subrange is defined by a minimum distance and a maximum distance. In each of the distance subranges calibration points 112 are provided at different distances from the surveying instrument. FIG. 21 shows the distance subranges and the calibration points only for visualization, actually the calibration points are provided by the collimator 66'.

The model is now extended in that G different sets of camera model parameter $(S_0, c_K, v, x_S, y_S)_I$, $I=1, \ldots G$, associated with the distance subranges are used in dependence on the distance. If the distance of a calibration point falls within one of the distance subranges, the corresponding camera model parameters, i.e. values of the camera model parameters, are used in the formulas for $U_x$ and $U_y$.

Calibration may then proceed as in the preceding exemplary embodiment, wherein after a change of distances of the calibration points the camera is re-focused. For minimization, all model parameters are adjusted, i.e. also the different sets of camera models.

After minimization, G sets of camera model parameters are obtained which may then be stored in a non-volatile of the surveying instrument 11. In the device-control unit 51 program code may be stored for calculating values of the camera model parameters as a function of distance, e.g. by interpolation between the values provided by the G camera model parameters provided by the calibration. Then, given the distance of a target, its coordinates or directions or bearing can be calculated as in the first exemplary embodiment using the camera model parameters obtained from interpolation.

In a variant of last-mentioned exemplary embodiment, the focusing status of the camera as defined by the positions of the focusing lens as determined in the device-control unit 51 may be used instead of the distances. It is to be noted that the position of the focusing lens is function of the distance of an object point an image of which is focused on the image sensor by motion of the focussing lens. This is particularly preferable in the case that the surveying instrument comprises an autofocusing device. Then, the position of the focusing lens may be automatically provided by the autofocusing device and used for calculations.

A further exemplary embodiment particularly suitable for calibrating a larger number of surveying instruments of the same type is based on the third exemplary embodiment. The distances of the calibration points, i.e. the positions of the mark or cross-hair 78, and the image positions of images of those calibration points are predetermined and stored in the data processing system. Thus, the distance may obtained by reading the corresponding data from the memory of the data processing system and the image positions need to be determined only once and can then be used for all instruments.

In yet another exemplary embodiment of the invention, images of calibration points are generated in the following way. As in the first exemplary embodiment, the camera is oriented to the calibration point so that the image of the calibration point is in the start position. However, in the present exemplary embodiment, the horizontal and vertical angles are set according to predetermined combinations of values. If the field of view is narrow, as the case for the telecamera 19, the angles may be given at constant intervals. These values may be chosen so that assuming no axis errors and an ideal camera having desired optical properties, the resulting image points are distributed homogeneously all over the image sensor. The actual distribution may differ due to the tolerances of the axes of the actual instrument and the optical properties of the actual camera. After setting these angles, the image position data are determined, e.g. again using object recognition, and stored together with the orientation data comprising the horizontal and vertical angles. The estimation of the model parameters, i.e. the minimization, is performed as in the first exemplary embodiment.

In a variant of this exemplary embodiment, for each combination of horizontal and vertical angles to be set according to the horizontal and vertical circles, the positions of image points of the calibration points on the image sensor are obtained in both faces of the instrument. I.e. if a horizontal angle is $Hz_I$ and a vertical angle is $V_I$ in the first face, the camera is set to a second horizontal angle $Hz_{II}$=200 gon+$Hz_I$ and an vertical angle $V_{II}$=400 gon−$V_I$, if the zenith corresponds to 0 gon. In another preferred exemplary embodiment as calibration points triple reflectors in different distances from the surveying instrument may be used. The distance data may be obtained using the distance measuring device 30.

The invention can also be used with a video-tacheometer with a telescope unit 16' shown in FIG. 21 which differs from the above-mentioned telescope unit 16.

It comprises a telescope 89 formed by an objective 31 as in the first exemplary embodiment, a focusing lens 91, a reversing prism 92, a cross-hair 93 and an eyepiece 94. An image is focused onto the cross-hair 93 by shifting the focusing lens 91 along the optical axis of the telescope as indicated by the arrows in FIG. 20. The telescope is used for sighting at a target.

A further device in the telescope unit 16' is constituted by the tracking device or tracker, respectively, which serves to automatically sight a reflector located in the target point and to track it, when it is being carried from one point to another. The tracker comprises a transmitter, which emits a narrow bundle of optical radiation; the objective 31 through which the bundle is incident in the direction of transmission and, after reflection at the target, in the receiving direction; receiving optics; a receiver 95, which detects the position of the bundle reflected back by the target and focused onto it by the receiving optics, and a closed-loop control which guides the telescope unit 16' or the alidade 12, respectively, such that the position of the ray bundle reflected back by the target remains constant on the receiver 95.

More precisely, the transmitter of the tracker comprises a radiation source 96 for emitting optical, preferably infrared, radiation, such as a laser diode, for example, and transmitting optics, which comprise first collimating optics 97 and a prism 98, at the oblique surface of which the ray bundle coming from the radiation source 96 and collimated by the first collimator optics 97 is reflected in the direction of the optical axis of the objective 31. The receiving optics are formed by a splitting prism 99 and second collimator optics 100. Finally, the receiver 95 comprises several detection elements which are sensitive to the radiation from the transmitter. For the receiver 95, use may be made of a quadrant diode or of a camera circuit, for example.

The transmitter of the tracker transmits the ray bundle, which has been emitted by the radiation source 96, collimated by the first collimator optics 97 and deflected onto the optical axis of the objective 31 by the prism 98, to the target, through the center of the objective 31. The ray bundle is reflected back to the tacheometer by the target, for example a triple mirror or reflector, respectively, and then enters the telescope unit 16' again, through the objective 31. On its way to the target and back, the ray bundle, which was narrow at first, has broadened so much, at a sufficiently great distance from the target, that it fills the entire diameter of the objective 31 upon its return, so that those parts of the ray bundle which are not incident on the prism 98 and are passing a dichroic mirror 101. The wavelength of the ray bundle emitted by the transmitter is selected such that the ray bundle passes the dichroic mirror 101 without substantial reflection, so that said mirror has practically no influence on said bundle. The ray bundle, having passed through the dichroic mirror 101, then enters the splitting prism 99. The splitting layer thereof selectively reflects at the wavelength of the radiation emitted by the transmitter, so that it deflects the ray bundle, which has entered the splitting prism 99, in the direction of the second collimator optics 100, but allows visible light to pass. The second collimator optics 100 focus the ray bundle from the transmitter, said bundle having been reflected by the target, onto the receiver 95 of the tracker. If the position of the image of the target on the receiver 95 deviates from a predetermined position, e.g. in the center, the tracker supplies a signal concerning amount and direction of such deviation to the device-control computer (not shown in FIG. 4), which controls the drives, so as to rotate the telescope unit 16', together with the alidade 12, if required, such that the image on the receiver 95 is at the predetermined position again, which is in the center in the example.

Further, a finder camera 102 is provided in the telescope unit 16'. The finder camera 102 comprises a camera objective 103 and an image sensor 104. Signals of the image sensor 104 are processed by an image processing circuit 105 which is connected to the device-control unit 51. The finder camera 102 can be used to find a target to be measured more easily. The finder camera 102 can be calibrated using the same method as described in the first exemplary embodiment as the projection center of the pinhole camera model can in principle be located arbitrarily with respect to the vertical axis.

The distance-measuring device 106 measures the distance from a target to the tacheometer by directing radiation to the target and receiving the radiation reflected back by it. The distance-measuring device 106 is formed by components of the telescope and by further components. An infrared-light source, which is not explicitly shown in FIG. 20 and emits infrared radiation in a pulsed manner within a predetermined wavelength range, for example a laser diode, directs infrared radiation, after focusing by transmitting/receiving optics 107, to a surface of the prism 108, which is reflective for the light from the infrared light source, and passes it from there to the dichroic mirror 101, which is reflective for the infrared light from the infrared-light source of the distance-measuring device 106 and, therefore, deflects the infrared light onto the objective 31. The infrared-light source and the transmitting/receiving optics 107 are arranged and formed such that the ray bundle emitted by the infrared-light source is focused along the optical path of the distance-measuring device 106, at a distance from the objective 31 which is the focal width of the objective 31, and thus, a near-parallel ray bundle is emitted by the objective 31, said ray bundle then impinging on a target, such as a reflector, for example a triple mirror, or also a natural target, e.g. the wall of a house. The reflected ray bundle passes back along the same path from the target, via the objective 31, the dichroic mirror 101 and the surface 108 of the prism 98, to the transmitting/receiving optics 107, which focus the ray bundle onto a receiving element (not shown in FIG. 20) of the distance-measuring device 106, which detects the radiation. The distance to the target is then determined from the transit time of a pulse between emission and reception, which transit time has been determined by means of a corresponding electronic circuit. Since the ray bundle is emitted along the optical axis of the objective 31, the distance to a target sighted by means of the telescope is determined on the optical axis.

Several aspects of the invention may be seen from another point of view as set out below. Therein, the terms tacheometer and tachymeter are used as synonyms.

Surveying increasingly makes use of video surveying instruments, especially video tachymeters or video theodolites, i.e. tachymeters or theodolites equipped not with an eyepiece but with a camera incorporating a spatially resolving detector array. The use of such cameras involves the problem of calibration, as the so-called interior and exterior orientation of the camera is unknown. The interior orientation is defined by two mutually orthogonal axes in the image plane and an axis normal to these extending from the origin to an eye-point or projection center O, in which all rays originating from object points intersect, and a coordinate system resulting therefrom. The position of this coordinate system relative to that of the surveying instrument is described by the exterior orientation, which allows for three translations and three rotations. As a rule, the camera will have a near-optimum alignment, with the perpendicular dropped from the projection center O onto the image plane coinciding with the optical axis of the instrument's telescope system, but in surveying instruments of the type mentioned above, maximum accuracy is of the essence, so that, e.g., residual errors of adjustment call for calibration, i.e. a determination of the camera model and the position of the camera relative to the instrument to which it is attached.

To calibrate cameras per se, the prior art uses photogrammetric methods. The presently most common method of camera calibration in terrestrial photogrammetry is known as simultaneous calibration. With this method, the calibration parameters of the camera are determined together with the evaluation of object information. The basis for image data evaluation and calibration, respectively, is an analytical model. Another method of camera calibration uses a test field. Such a test field has signalized targets, e.g., illuminated object points, the coordinates and/or scale data of which are known. The test field usually has three dimensions and is photographed using different capturing configurations, i.e. positions of the camera relative to the test field. Just like the method of simultaneous calibration, the method of camera calibration by means of a test field is based on an analytical model. In this model, the parameters of the orientations are determined from the functional relationship between object information and image coordinates. For this, one requires suitable geometries of intersection of the imaging rays or the capturing geometries and the spatial extension of the field with the object points. The larger and especially the deeper the space available for the object points, the greater is the accuracy and reliability with which the camera can be calibrated. It is of advantage to make redundant measurements, i.e. to collect observations in excess of the number of parameters to be determined. By means of an adjustment procedure, the parameters can then be determined with greater reliability. An adjustment procedure that is well established in geodesy is the least-squares method.

The basis of any analytical model is provided by what is known as collinearity equations, which establish the functional relationship between the coordinates (X,Y,Z) of an object point in a so-called exterior space and the image coordinates $(x',y',-c_K)$ of the image of the object point in the so-called interior space, a coordinate system that describes the interior orientation of the camera $c_K$ is known as the calibrated focal length or also as the camera constant, the absolute value of which may be comparable to the focal length f of the imaging optics. For the x' and y' image coordinates in the interior coordinate system, the collinearity equations are $$x' = x'_0 - c_K \frac{r_{11}(X-X_0)+r_{21}(Y-Y_0)+r_{31}(Z-Z_0)}{r_{13}(X-X_0)+r_{23}(Y-Y_0)+r_{33}(Z-Z_0)} + \Delta x'$$

$$y' = y'_0 - c_K \frac{r_{12}(X-X_0)+r_{22}(Y-Y_0)+r_{32}(Z-Z_0)}{r_{13}(X-X_0)+r_{23}(Y-Y_0)+r_{33}(Z-Z_0)} + \Delta y'$$

The coordinates $(X_0, Y_0, Z_0)$ indicate the position of the eye-point or projection center O in the exterior space, which is, at the same time, the origin of the image coordinate system. The magnitudes $r_{ij}$ with $i,j=1,\ldots,3$ are elements of a rotation matrix R, which describes the rotation of the image coordinate system relative to the exterior coordinate system. In this way, the coordinates (X,Y,Z) of a point in the exterior space can be transformed into image coordinates. Reversely, object coordinates cannot be computed from image coordinates unless further information is known, such as, e.g., the distance of the object point from the position of the camera at the time of image-capturing. The coordinates $x'_o$ and $y'_o$ describe the position of the so-called principal point in the image plane of the camera. This is defined by the piercing point along the perpendicular connecting the image plane with the projection center O. Allowance for the camera lens is made by the calibrated focal length $c_K$ on the one hand, and by the distortion parameters $\Delta x'$, $\Delta y'$ that reflect the imaging errors of the camera optics on the other hand.

If a camera is used in a surveying instrument such as a tachymeter or theodolite, the known photogrammetric methods cannot be used readily, as in addition to the parameter of interior and exterior orientation there are instrument-specific parameters and possibly also errors of the instrument axes. In case a tachymeter is used, the bearing measurements made with the instrument have to be included in the calibration. Approaches to this problem are also known in the prior art; arguably the closest prior art is in an article by Y. D. Huang, "Calibration of the Wild P32 Camera using the Camera-ON-Theodolite method", published in Photogrammetric Record, 16(91), 1998. Huang connects one or maximally two reference points arranged at different distances to the instrument (this term denotes the system consisting of the surveying instrument proper and the camera). These reference points are observed with the camera to be calibrated, at different instrument directions, i.e. different combinations of horizontal and vertical angles to be set on the instrument. As Huang uses a theodolite, the distance between the two points, or the distances between the points and the instrument must be known. The drawback of Huang's method is that instrument errors such as tilting axis and lateral collimation errors remain unconsidered. Calibration errors are larger depending on the magnitude of these instrument errors, which diminishes the overall accuracy of the instrument.

Departing from this state of prior art, the problem underlying the invention is to develop an improved method for calibrating a surveying instrument equipped with a camera that comprises a spatially resolving detector array.

Given a method for calibrating a surveying instrument equipped with a camera incorporating a spatially resolving detector array, in which the surveying instrument is used for successively sighting given reference points $P_i$ with $i=1,\ldots,N$ and a positive integer N, to establish the distance to each reference point $P_i$, to determine, in a first position or first face, the image coordinates of the image of the reference point $P_I$ in the camera's image plane for different combinations of horizontal angles $Hz_I$ and vertical angles $V_I$ to be set on the instrument, to save these image coordinates in association with the respective angle combination ($Hz_I, V_I$), and in which an adjustment procedure is used to establish the position of the camera relative to the surveying instrument from the saved data, this problem is solved in such a way that, for each of the angle combinations, a second position or second face is set by turning the surveying instrument about a vertical axis by 200 gon and setting it to a horizontal angle $Hz_{II}$, and by turning the camera about a horizontal tilting axis and setting it to a vertical angle $V_{II}$ with $V_{II}$=400 gon–$V_I$. A vertical angle of 0 gon corresponds to sighting of the zenith. In the second position or face, again the image coordinates of the reference point $P_i$ are determined and saved in association with the respective angle combination ($Hz_{II}, V_{II}$). Finally, calibration is effected using the data of the angle combinations saved in both positions or faces, respectively, i.e. the image coordinates saved in association with the respective angle combination.

In other words, there is provided a method for calibrating a surveying instrument equipped with a camera comprising a spatially resolving detector array, in which the surveying instrument is used to sight, in succession, predetermined reference points ($P_i$), with i=1, . . . ,N and a natural number (N), for each reference point ($P_i$), the distance is determined and, in a first position or face, the image coordinates of the image of the reference point ($P_i$) in the image plane of the camera are determined for different given combinations of horizontal angles ($Hz_I$) and vertical angles ($V_I$) to be set on the surveying instrument, and saved in association with the respective angle combination ($Hz_I, V_I$), and the position of the camera relative to the surveying instrument is determined by means of an adjustment procedure on the basis of the saved data, characterized in that, for each of the angle combinations, a second position or face is set by turning the surveying instrument by 200 gon about a vertical axis and setting it to a horizontal angle ($Hz_{II}$), and by turning the camera about a horizontal tilting axis and setting it to a vertical angle ($V_{II}$) with $V_{II}$=400 gon–$V_I$, with a vertical angle of 0 gon corresponding to a sighting of the zenith, and in that, in the second position or face likewise, the image coordinates of the image of the reference point ($P_i$) are determined and saved in association with the respective angle combination ($Hz_{II}, V_{II}$), and in that the calibration is performed using the data saved for both positions or faces.

In the first position or face, a horizontal angle $Hz_I$ and a vertical angle $V_I$ are set on the instrument. For setting the second position or face, the instrument is first turned out of the originally set horizontal angle $Hz_I$ by 200 gon, i.e. a half circle, and thus the horizontal angle $Hz_{II}$ is set in the second position or face. After this, the vertical angle $V_{II}$ is set in accordance with the equation $$V_{II}=400\ gon-V_I$$

This allows for the fact that the scale by which the vertical angle is set takes part in the rotation of the vertical axis. In this procedure, the zero point of the vertical angle scale, i.e. the point at which the vertical angle is 0 gon, has been positioned to the zenith, which means that the camera optics faces vertically up if this angle is set.

In this procedure it does not matter whether the second position or face is set directly after measuring in the first position or face for each of the angle combinations, or whether one takes all measurements in the first position or face, followed by all measurements in the second position or face. In general, the latter option should be preferred, as the instrument is less stressed by wide-range rotations.

Together with an extended mathematical model, this method allows to achieve higher accuracy in calibration. The basis here again is formed by the collinearity equations, with the difference that both the projection center and the object point in the exterior space are described in terms of polar coordinates. The additional parameters resulting from the use of the surveying instrument are partially allowed for in the photogrammetric model by further rotation matrices, the multiplication of which yields the total rotation matrix. As the camera is rigidly connected with the surveying instrument, the camera takes part in the rotations of the instrument about the vertical axis and/or horizontal tilting axis. As the surveying instrument is provided with an angle measuring system, two rotation angles are measured directly. It is further necessary to allow for constant angular deviations, which have the effect of rotations. These include the instrument's tilting axis error, which occurs if the tilting is not at right angles with the vertical axis, and a lateral deviation of the projection center from the theoretical sighting axis, the effect of which corresponds to that of a lateral collimation error.

In a preferred embodiment of the invention, the reference points $P_i$ are given or located, at different distances from the surveying instrument. In this way, the accuracy of calibration can be further increased. The accuracy of the method is the higher, the farther the points are spaced from each other in spatial depth.

In a particularly preferred embodiment of the method, the reference points $P_i$ are given or located, by means of a collimator and a floating mark that can be shifted between the collimator lens or collimator objective and its focal point. The prior art frequently uses collimators together with geodesic instruments for adjusting and measuring procedures. Collimators are characterized in that they emit parallel light rays and project a point lying at optical infinity into a finite distance. The floating mark—cross-hairs, a slit or a stop of some other shape—is provided at the collimator's focal point. In case of a collimator having an extension, the floating mark can be shifted between the collimator lens or objective and the focal point of the collimator lens or objective. The amount of shift can, as a rule, be read to micrometer accuracy. From the amount of shift relative to the focal point and the focal length, one can determine the image distance of the virtual, erect image. This image is now observed with the surveying instrument to be calibrated. From the sum of the distance from the vertical axis of the instrument to the principal focal plane of the collimator lens or objective and the image distance there results the final distance between the instrument and the virtual reference point created by the collimator. A collimator can thus be used to create reference points at distances as large as 2000 m or more, whereas it is difficult to create reference points at such distances without a collimator: It is difficult enough to find such a distance that is free from sighting obstacles; additional factors that can impair the measurements are atmospheric phenomena like air turbulence. Moreover, reference points of different sizes would be needed for different distances in order to obtain respective image points approximately equal in size. Calibration by means of a collimator is therefore particularly suitable for calibration of finished instruments by the manufacturer, as it takes little space and can be largely automated. Finally, this method makes calibration independent of environmental conditions, as the spatially resolving detector array of the camera, which, as a rule, is composed of pixels, is frequently subject to influences by ambient light.

In another embodiment of the method, the angle combinations are predetermined or given by a grid. The grid is chosen so that, when positions are set that represent the angle combinations, the reference points are distributed as homogeneously as possible all over the image plane.

In yet another embodiment of the method, for each of the angle combinations corresponding to a position in the grid, setting of the surveying instrument to this position includes the determination of, and allowing for, a random deviation from this position. The random deviation may be smaller, in any direction, than half the distance between two grid positions in that direction. In this way, a possibly existing systematic error, which would be detected only during the adjustment computation, can be reduced. It is expedient not to allow the errors to be greater than half the distance between two adjacent grid positions in either direction, or else the homogeneity of distribution of the images of the reference points would be substantially impaired. The random errors of each angle combination need not be equal for the first and second positions or faces and may be determined separately. I.e., for each angle combination, the random deviations may be determined separately for the first and second positions or faces. The determination may be effected, e.g., by computation using a sequence of pseudo-random numbers.

If a tachymeter is used, it is of advantage to determine the distance to the reference points $P_i$ by means of electro-optical distance measurement.

Hereinafter, another exemplary embodiment of the invention is described in detail with reference to an embodiment example in the form of a tachymeter and with reference to the drawings 23 to 26.

FIG. 23 schematically shows, first of all, the design of a tachymeter that can be used for performing the method according to the invention. Arranged on a fixed lower part 201 supported by a tribrach, an upper part 202—shown in a sectional view here—can be rotated about the vertical axis via a bearing 203. Rotation of the upper part 202 can be effected by means of a horizontal drive 204. The angle $Hz_I$ or $Hz_{II}$ set on a horizontal graded circle 205 is automatically recorded through a horizontal sensing head 206 and transmitted to a control and data analysis unit (not shown). Also shown is a telescope body 207 having the function of a camera, which is mounted rotatable about the tilting axis via a bearing 208 connected with the upper part 202. The telescope body 207 contains an objective 209, a focusing lens, and a detector array, for example a CCD array. Rotation of the telescope body 207 can be effected by means of a vertical drive 210. The angle $V_I$ or $V_{II}$ set on a vertical graded circle 211 is transmitted to the control and data analysis unit via a vertical sensing head 212.

FIG. 24 shows the image coordinate system with the coordinates $(x',y',-c_K)$ as related to the superordinate coordinate system $(X,Y,Z)$. The drawing shows the origin of the superordinate coordinate system as lying at the center of the horizontal circle on which the horizontal angle set on the tachymeter or theodolite is read, as the said coordinate system does not change its position in space; actually, however, the said origin lies at the intersection of the vertical, tilting and sighting axes (tachymeter center). The Z axis of the superordinate system coincides with the vertical axis of the instrument, and the Y axis coincides with the zero direction marked on the horizontal circle. The origin of the image coordinate system is the principal point H' having the coordinates $x'_0$ and $y'_0$ in the image plane; this principal point is defined by the piercing point of a connection line to the projection center O, this line being normal to the image plane. Also shown are three rotations with angles $\kappa, \phi, \omega$, which are independent of any errors and directions of the tachymeter and are essentially given by the mounting of the camera relative to the sighting optics. They are described by the rotation matrix $$R_\omega(\omega) \cdot R_\phi(\phi) \cdot R_\kappa(\kappa) =$$
$$\begin{bmatrix} \cos(\phi)\cos(\kappa) & -\cos(\phi)\sin(\kappa) & \sin(\phi) \\ \cos(\omega)\sin(\kappa) + \sin(\omega)\sin(\phi)\cos(\kappa) & \cos(\omega)\cos(\kappa) - \sin(\omega)\sin(\phi)\sin(\kappa) & -\sin(\omega)\cos(\phi) \\ \sin(\omega)\sin(\kappa) - \cos(\omega)\sin(\phi)\cos(\kappa) & \sin(\omega)\cos(\kappa) + \cos(\omega)\sin(\phi)\sin(\kappa) & \cos(\omega)\cos(\phi) \end{bmatrix}$$

The distance between the principal point H' and the projection center O is the calibrated focal length $c_K$.

The Z axis intersects the tilting axis about which the vertical rotations take place. Because of the tilting axis error, the real tilting axis, shown in FIG. 24 as a solid line, deviates from the theoretical tilting axis shown as a dashed line. The angular deviation between the non-orthogonality of the tilting axis and the instrument's vertical axis is designated i. Likewise, the real sighting axis, which corresponds to the direction of image capturing and is shown in the drawing as −z' axis of the image coordinate system, deviates from the theoretical sighting axis, which is shown as a broken line. As, furthermore, the projection center O does not coincide with the instrument center, which is defined by the point of intersection of the vertical and tilting axes, further parameters have to be introduced to complete the model and obtain the complete rotation matrix: The parameter $S_0$ describes the oblique distance from the instrument center to the projection center O. The parameter $c_0$ describes the angular deviation of the projection center O from the theoretical sighting axis that is orthogonal with the tilting axis, and the parameter $z_0$ describes the vertical angular deviation of the projection center O from an oriented theoretical sighting axis. Further important quantities are explained in FIG. 25 and FIG. 26. Shown in FIG. 25 is the horizontal angle $Hz_{I/II}$ read off the instrument, the index "I/II" meaning that this may be either the horizontal angle $Hz_I$ read in the first position or face or the angle $Hz_{II}$ read in the second position or face. The value of the horizontal angle $Hz_{I/II}$ depends on the position of the sensing head inside the instrument, which is marked here by the distance a. The angle $c_F$ is the angular deviation of the mechanical axis of the telescope body from the theoretical sighting axis, i.e. the angular deviation from orthogonality with the tilting axis. The mechanical axis of the telescope body is defined by the centricity of the optical components such as objective, sliding lens and eyepiece. In case of the optical components being ideally centered and aligned, this axis coincides with the optical axis of the telescope body. $c_F$ acts like a classical lateral collimation error; it acts exclusively on the camera, and not on the projection center. Also shown in the drawing are an object point P and its corresponding image point P' in the image plane with the coordinates $(x'_P, y'_P, -c_K)$. Finally, shown in FIG. 26, which shows the vertical plane, is the vertical direction $V_{I/II}$ read off relative to the vertical axis; this direction is shown in the form of an angle. Here again, the index "I/II" means that this may be either the vertical angle $V_I$ read in the first position or face or the vertical angle $V_{II}$ read in the second position or face.

With these designations, the coordinates of the projection center O result as $$O = \begin{bmatrix} X_0 \\ Y_0 \\ Z_0 \end{bmatrix} = \begin{bmatrix} S_0 \cdot \sin(V_{I/II} + z_0) \cdot \sin\left(Hz_{I/II} + \frac{c_0}{\sin(V_{I/II} + z_0)} + i \cdot \cot(V_{I/II} + z_0)\right) \\ S_0 \cdot \sin(V_{I/II} + z_0) \cdot \cos\left(Hz_{I/II} + \frac{c_0}{\sin(V_{I/II} + z_0)} + i \cdot \cot(V_{I/II} + z_0)\right) \\ S_0 \cdot \cos(V_{I/II} + z_0) \end{bmatrix}$$

These are then used in the collinearity equations.

To obtain a rotation matrix for the total rotation of the image coordinate system of the camera built into the instrument, seven rotations are executed in succession. The first rotation is that of the alidade, i.e. that of the instrument about the vertical axis. This rotation is indirectly combined with the angle $Hz_{I/II}$. Here it is necessary, however, to make allowance for the influences of a potential error of the instrument's tilting axis, described by the angle i, and of the deviation $c_F$, of the axis of the telescope body from orthogonality with the tilting axis. This results in an improved horizontal angle $Hz_K$:

$$Hz_K = Hz_{I/II} + \frac{c_F}{\sin(V_0)} + i \cdot \cot(V_0)$$

$V_0 = V_{I/II} + z_0$ designates the vertical angle of the projection center. If rotation by the angle $-Hz_K$ takes place about the z' axis of the image coordinate system, the resulting rotation matrix is:

$$R_\kappa(Hz_K) = \begin{bmatrix} \cos(-Hz_K) & \sin(-Hz_K) & 0 \\ -\sin(-Hz_K) & \cos(-Hz_K) & 0 \\ 0 & 0 & 1 \end{bmatrix}$$

With the rotation of the alidade about the vertical axis completed, and with no further mechanical movement taking place, a tilting axis error acts on the image coordinate system as a rotation.

This rotation is executed as a second rotation by the angle i about the y' axis, which took part in the first rotation. Assuming that the tilting axis is, in this constellation, approximately parallel with the x' axis, the resulting rotation matrix is $$R_\phi(i) = \begin{bmatrix} \cos(i) & 0 & \sin(i) \\ 0 & 1 & 0 \\ -\sin(i) & 0 & \cos(i) \end{bmatrix}$$

The next rotation to be considered is that of the image coordinate system by the vertical angle. This rotation can be directly related to the direction $V_{I/II}$ measured on the instrument, allowing for the correction $z_0$. As a matter of principle, the image coordinate system is rotated by 200 gon about the x' axis. The rotation matrix is $$R_\omega(V_0) = \begin{bmatrix} 1 & 0 & 0 \\ 0 & \cos(200gon - V_0) & -\sin(200gon - V_0) \\ 0 & \sin(200gon - V_0) & \cos(200gon - V_0) \end{bmatrix}$$

The next rotation, which again acts internally only, is effected by the deviation $c_F$ of the axis of the telescope body. The rotation matrix in this case is $$R_\phi(c_F) = \begin{bmatrix} \cos(c_F) & 0 & \sin(c_F) \\ 0 & 1 & 0 \\ -\sin(c_F) & 0 & \cos(c_F) \end{bmatrix}$$

This is followed by the three rotations about the angles $\kappa$, $\phi$ and $\omega$ mentioned above, which again are internal only. The total rotation matrix R then results from successive multiplication of the rotation matrices in the correct order, viz.:

$$R = R_\kappa(Hz_K) \cdot R_\phi(k_0) \cdot R_\omega(V_0) \cdot R_\phi(c_F) \cdot R_\omega(\omega) \cdot R_\phi(\phi) \cdot R_\kappa(\kappa)$$

In this way, it is possible to describe the rotations of a camera integrated in the instrument arbitrarily, considering instrument-specific parameters and with the aid of a direction measurement. The elements $r_{i,j}$ of the rotation matrix R are also used as input quantities for the collinearity equations.

If, for calibrating a camera having a focal length of 300 mm and a fixed focus at 100 m, fitted to an instrument having an angle measuring accuracy of 1", one uses three points at distances of, e.g., 20 m, 80 m and 500 m, and a total of 48 angle combinations per telescope position, arranged in a grid of 8×6 positions, with 30 measurements per angle combination in which no random deviation is greater than 0.05 pixels, the instrument can be calibrated to an accuracy of direction measurement of approximately 1" in the vertical and horizontal directions. Attempts to calibrate long-focus cameras by conventional calibration methods have failed so far.

It should be noted here that this way of calibration also allows instrumental directions to be derived from the image coordinates. Thus it is possible to carry out a direction measurement outside the sighting axis. Due to this calibration, the projection center can be computed in terms of Cartesian coordinates in any position of the instrument. Using the formula $$P'_T = \vec{O} + R \cdot \begin{bmatrix} x'_P - \Delta x' \\ y'_P - \Delta y' \\ -c_K \end{bmatrix}$$

it is possible to transform measured image coordinates into the coordinate system of the tachymeter. $P'_T$ is a vector with the measured image coordinates transformed into the tachymeter coordinate system. The projection center O and the point $P'_T$ are both known in terms of coordinates with reference to the tachymeter, and define an imaging ray g. As this does not intersect the tachymeter center, a distance (approximate distance) of the object point P from the tachymeter center must be given for the strict direction derivation referenced to the tachymeter center. This distance is used as the radius of a sphere extending around the tachymeter center and intersected by the imaging ray g. In this way, two coordinate triplets are obtained, which can be used for direction computation, depending on the position of the telescope body that has the function of a camera. The closer the tachymeter center is to the imaging ray, the less dependent this method becomes from the distance given.

Although the method was explained above using a tachymeter, it can also be used with other surveying instruments such as theodolites or so-called scanners, provided that they satisfy the prerequisites described herein.

With the camera calibration thus performed, it is also possible to define the photogrammetric sighting axis, namely, as the straight line connecting the projection center O with the instrument center formed by the intersection of the tilting and vertical axes. This sighting axis is not identical, though, with the actual sighting axis shown in FIG. 25. The piercing point of the photogrammetric sighting axis in the image plane determines the position of cross-hairs, at which the classical lateral collimation error and vertical height index error are constant along the distance. Unless they were determined during parameter estimation, the lateral and vertical deviations of the projection center can be measured with that pixel at which the classical errors of lateral and vertical collimation do not change along the distance.

If an object point were sighted with cross-hairs defined in this way, the cross-hairs, the tachymeter center, the projection center O and the object point P would lie on a straight line, this straight line being identical with a photogrammetric imaging ray.

The position of the cross-hairs, defined in conventional instruments as that point in the image plane at which the lateral collimation error and vertical height index error are equal to zero, can, in the same way, be assigned to a pixel on the camera's detector surface; with optical components less well centered, this pixel may, in the worst case, vary with distance.

The invention claimed is:

1. A method for calibrating a surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, wherein data associated with calibration points and images of the calibration points on the image sensor captured in different faces are used, the data for each of said calibration points comprising distance data representing a distance between each said calibration point and the surveying instrument and the data for each of the images of each said calibration point comprising image position data representing the position of the image of each said calibration point on said image sensor and orientation data representing a horizontal angle of rotation of the tilting axis about the vertical axis and a vertical angle of tilting of the camera about the tilting axis, and wherein on the basis of the distance data for each of the calibration points and the image position and orientation data for each of the images of the calibration points the surveying instrument is calibrated simultaneously taking into account at least one optical property of the camera and at least one of the relative orientation of the vertical axis and the tilting axis and the orientation of the camera relative to one of the base element, the vertical axis and the tilting axis.

2. A method for calibrating a surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, wherein images of calibration points are generated at different positions on the image sensor and in two faces, wherein for each of said calibration points the distance data representing a distance between the respective calibration point and the surveying instrument and for each image of said calibration points position data representing the position of the image of the calibration point on the image sensor, orientation data representing a horizontal angle of rotation of the tilting axis about the vertical axis and a vertical angle of tilting of the camera of the tilting axis are determined, and wherein on the basis of the distance data for each of the calibration points and the position and orientation data for each of the images of the calibration points the surveying instrument is calibrated simultaneously taking into account at least one optical property of the camera and at least one of the relative orientation of the vertical axis and the tilting axis and the orientation of the camera relative to one of the base element, the vertical axis and the tilting axis.

3. The method according to claim 1, wherein a model is used for calculating the positions of images of calibration points on the image sensor, the model comprising adjustable model parameters and using distance data and orientation data associated with each of the images of the calibration points, and for calibration the model is fitted to the position data by estimating at least directions of the calibration points and the model parameters using the distance data, the position data and the orientation data.

4. The method according to claim 3, wherein for estimation of the directions of the calibration points and of the model parameters a maximum likelihood estimate is used.

5. The method according to claim 3, wherein at least one of the model parameters depends on the distance of the calibration point from the surveying instrument or on a focusing state of the camera when capturing an image of the calibration point.

6. The method according to claim 3, wherein the model comprises a transformation for transforming coordinates in an instrument coordinate system fixed to the base element to a camera coordinate system fixed to the camera and a camera model for mapping positions of calibration points to positions on the image sensor in the camera coordinate system, the transformation having adjustable transformation parameters and the camera model having adjustable camera parameters, and for calibration the coordinates of the calibration points in the instrument coordinate system and the transformation parameters and camera parameters are estimated, so that positions of the images of the calibration points as calculated by the model are fitted to the measured positions of images of the calibration points.

7. The method according to claim 1, wherein the calibration is performed also taking into account at least one of a vertical index error and a collimation error.

8. The method according to claim 1, wherein the calibration includes estimating the orientation of the camera relative to one of the tilting axis and an instrument coordinate system fixed to the base element.

9. The method according to claim 3, wherein the camera model comprises a projection center in which according to the camera model all rays from object points imaged onto the image sensor intersect, and wherein at least one model parameter relates to the location of the projection center.

10. The method according to claim 1, wherein the distance data associated with at least two calibration points differ.

11. The method according to claim 1, wherein images captured by the image sensor are obtained, the captured images comprising images of at least one of the calibration points, and wherein the position of said images of said at least one of the calibration points on the image sensor is determined by searching for the images of the calibration point in the images.

12. The method according to claim 2, wherein the distance of at least one of the calibration points to the surveying instrument is determined using optoelectronic distance metering.

13. The method according to claim 2, wherein at least one object point is imaged to a virtual calibration point which is imaged onto the image sensor.

14. The method according to claim 13, wherein the virtual calibration points are generated by means of a collimator and a mark that can be shifted between a collimator objective and a focal point of the collimator objective.

15. The method according to claim 2, wherein for at least one of the calibration points the positions of images of the image sensor are predetermined, wherein the camera is directed to the calibration point by at least one of rotating about the vertical axis and tilting about the tilting axis until the calibration point is imaged to the predetermined position of the image sensor, and wherein the resulting orientation data are read.

16. The method according to claim 14, wherein for at least one of the calibration points images of the calibration point are generated in a regular arrangement on the image sensor.

17. The method according to claim 15, wherein for at least one of the calibration points an arrangement of cells covering a predetermined area of the image sensor is generated and random positions within the cells are used as positions of images of the calibration point.

18. The method according to claim 2, wherein for at least one of the calibration points the camera is directed into predetermined orientations, the orientations being defined by predetermined combinations of horizontal and vertical angles or horizontal and vertical angle increments, and wherein in each orientation image position data for a respective image of the calibration point are obtained.

19. The method according to claim 18, wherein the image position data and the corresponding orientation data are obtained for both faces.

20. A data processing system comprising a processor, a memory, in which there is stored a computer program for performing the method according to claim 1, when the program is executed by the processor, and further comprising an interface for reading data associated with calibration points and images of the calibration points used in the method.

21. The data processing system according to claim 20, further comprising an output interface for outputting commands to a drive of a collimator for moving a mark of the collimator between an objective of the collimator and the focal point of the collimator, wherein the computer program comprises instructions to move the mark to generate virtual calibration points at different distances.

22. The data processing system according to claim 20, further comprising an interface for issuing control commands to the surveying instrument, the surveying instrument comprising a base element and a camera with an image sensor, the camera being rotatable about a vertical axis fixed with respect to said base element of the surveying instrument and being rotatable about a tilting axis, the titling axis being rotated about the vertical axis with rotation of the camera about the vertical axis and the surveying instrument comprising drives for rotating the camera about the vertical axis and tilting the camera about the tilting axis controllable by the control commands, the computer program further comprising program code to generate images of a calibration point and predetermined positions on the image sensor.

23. A computer program comprising program code for performing the method according to claim 1 when the computer program is run on a computer.

24. A computer program product comprising program code stored on a computer readable storage medium for performing the method according to claim 1, when said program product is run on a computer.

25. A computer program according to claim 23, further comprising a program code to generate images of a calibration point and predetermined positions on the image sensor by issuing control commands to the surveying instrument.

26. A system for calibrating a surveying instrument, the surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, the system comprising a collimator, a mark that can be shifted between a collimator objective and a focal point of the collimator objective, and a drive for shifting the mark, and a data processing system according to claim 19, the output interface being connected with the drive of the collimator to move the mark in response to control commands generated by the data processing system.

27. A surveying instrument comprising a base element and a camera with an image sensor, the camera being rotatable about a vertical axis fixed with respect to said base element and being rotatable about a tilting axis, the tilting axis being rotated about the vertical axis with rotation of the camera about the vertical axis, the survey instrument being calibrated using a method according to claim 1.

* * * * *